US011856332B2

(12) United States Patent
Takahashi

(10) Patent No.: US 11,856,332 B2
(45) Date of Patent: Dec. 26, 2023

(54) REMOTE OPERATION SYSTEM, REMOTE OPERATION MOBILE BODY, REMOTE OPERATION METHOD, AND PROGRAM

(71) Applicant: TOYOTA JIDOSHA KABUSHIKI KAISHA, Toyota (JP)

(72) Inventor: Masahiro Takahashi, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/699,771

(22) Filed: Mar. 21, 2022

(65) Prior Publication Data

US 2022/0311975 A1    Sep. 29, 2022

(30) Foreign Application Priority Data

Mar. 24, 2021   (JP) ................... 2021-049877

(51) Int. Cl.
*H04N 7/18* (2006.01)
*H04N 23/66* (2023.01)
*H04N 23/695* (2023.01)

(52) U.S. Cl.
CPC ............. *H04N 7/181* (2013.01); *H04N 23/66* (2023.01); *H04N 23/695* (2023.01)

(58) Field of Classification Search
CPC .......... H04N 7/18; H04N 7/181; H04N 23/66; H04N 23/661; H04N 23/69; H04N 23/695
USPC ........................................................ 348/159
See application file for complete search history.

(56) References Cited

U.S. PATENT DOCUMENTS

| | | | |
|---|---|---|---|
| 8,115,814 B2* | 2/2012 | Iwase | H04N 23/662 396/54 |
| 2012/0032795 A1* | 2/2012 | Ishii | H04N 23/64 340/539.1 |
| 2018/0373239 A1* | 12/2018 | Tsubota | B25J 11/008 |
| 2020/0133239 A1* | 4/2020 | Yamamoto | G06F 3/0484 |
| 2021/0001487 A1* | 1/2021 | Ohtsuka | B25J 9/1689 |
| 2021/0037214 A1* | 2/2021 | Itoh | H04N 13/117 |

(Continued)

FOREIGN PATENT DOCUMENTS

JP    2003-158664 A    5/2003
JP    5070441 B2    11/2012

Primary Examiner — Jonathan R Messmore
Assistant Examiner — Asmamaw G Tarko
(74) Attorney, Agent, or Firm — Dinsmore & Shohl LLP

(57) ABSTRACT

Each remote operation robot includes: an imaging direction detection unit configured to detect an imaging direction of a camera, an imaging direction information generation unit configured to generate imaging direction information indicating the imaging direction detected by the imaging direction detection unit, an imaging direction information transmission unit configured to transmit imaging direction information to another remote operation robot, an imaging direction information reception unit configured to receive the imaging direction information from another remote operation robot, and an imaging direction control unit configured to control the imaging direction of the camera based on the imaging direction information received by the imaging direction information reception unit in such a way that the imaging direction of the camera of the own robot is synchronized with the imaging direction of the camera of the robot that has transmitted the imaging direction information received by the imaging direction information reception unit.

17 Claims, 12 Drawing Sheets

(56) References Cited

U.S. PATENT DOCUMENTS

| 2022/0019215 A1* | 1/2022 | Thomsen | G05D 1/0038 |
| 2023/0209016 A1* | 6/2023 | Park | H04N 7/181 |
| | | | 348/159 |
| 2023/0209186 A1* | 6/2023 | Burke | H04N 7/181 |
| | | | 348/159 |

* cited by examiner

| USER NAME | ROBOT ID |
|---|---|
| USER B | 8231 |
| USER D | 3954 |
| USER R | 3847 |
| USER Z | 18273 |

Fig. 3

| ROBOT ID | CURRENT LOCATION |
|---|---|
| 8231 | 35.0841779957118, 138.8571869813099 |
| 2341 | 35.0841028235368S, 138.8568945697484S |

Fig. 4

REMOTE OPERATION SYSTEM, REMOTE OPERATION MOBILE BODY, REMOTE OPERATION METHOD, AND PROGRAM

CROSS REFERENCE TO RELATED APPLICATIONS

This application is based upon and claims the benefit of priority from Japanese patent application No. 2021-49877, filed on Mar. 24, 2021, the disclosure of which is incorporated herein in its entirety by reference.

BACKGROUND

The present disclosure relates to a remote operation system, a remote operation mobile body, a remote operation method, and a program.

Patent Literature 1 (Japanese Patent No. 5070441) discloses a robot that can be remotely operated using an operation terminal. Specifically, the robot includes a camera that captures an image of the face of a human who has approached the robot. A display apparatus of the operation terminal displays the image of the face of the human captured by the camera. Accordingly, an operator of the operation terminal is able to see the human interacting with the robot in real time.

SUMMARY

Incidentally, when a plurality of users who are present in locations away from each other remotely operate a plurality of respective remote operation robots that are present in one place by operating respective remote operation terminals that these users have, they may want to communicate with each other.

However, each of the users cannot know what the other users are currently watching via their remote operation terminals and the remote operation robots. Therefore, they cannot smoothly communicate with each other.

The aim of the present disclosure is to provide a technique for enabling a plurality of users who are present in locations away from each other to smoothly communicate with each other when they remotely operate a plurality of respective remote operation mobile bodies that are located in one place by operating respective remote operation terminals that the plurality of users have.

According to a first aspect of the present disclosure, a remote operation system in which a plurality of users who are present in locations away from each other remotely operate a plurality of respective remote operation mobile bodies that are located in one place by operating respective remote operation terminals that the plurality of users have, the remote operation system including: the plurality of remote operation mobile bodies; and the plurality of remote operation terminals, in which each of the remote operation mobile bodies includes: a control command reception unit configured to receive a control command from the corresponding remote operation terminal; an operation control unit configured to control the operation of the own remote operation mobile body based on the control command; an imaging unit; a captured image information acquisition unit configured to acquire captured image information from the imaging unit; a captured image information transmission unit configured to transmit the captured image information to the corresponding remote operation terminal; an imaging direction detection unit configured to detect an imaging direction of the imaging unit; an imaging direction information generation unit configured to generate imaging direction information indicating the imaging direction detected by the imaging direction detection unit; an imaging direction information transmission unit configured to transmit the imaging direction information to another remote operation mobile body; an imaging direction information reception unit configured to receive the imaging direction information from another remote operation mobile body; and an imaging direction control unit configured to control the imaging direction of the imaging unit based on the imaging direction information received by the imaging direction information reception unit in such a way that the imaging direction of the imaging unit is synchronized with the imaging direction of the imaging unit of the remote operation mobile body that has transmitted the imaging direction information received by the imaging direction information reception unit, and each of the remote operation terminals includes: a control command input unit configured to accept an operation of inputting the control command; a control command transmission unit configured to transmit the control command to the corresponding remote operation mobile body; a captured image information reception unit configured to receive the captured image information from the corresponding remote operation mobile body; and a captured image information display unit configured to display the captured image information is provided. According to the above configuration, the imaging directions of the imaging units of the plurality of remote operation mobile bodies are synchronized with each other, which enables the captured image information display units of the plurality of remote operation terminals to display the captured images similar to each other, whereby a plurality of users can smoothly communicate with each other.

The imaging direction information may include information indicating the azimuth angle and the elevation/depression angle of the imaging direction of the imaging unit. According to the above configuration, the imaging direction control unit is able to smoothly execute synchronization processing.

Each of the remote operation mobile bodies may further include: an own body identification information storage unit configured to store body identification information of the own remote operation mobile body; a current location information acquisition unit configured to acquire current location information; an identification location information transmission unit configured to transmit identification location information including the body identification information and the current location information to another remote operation mobile body; an another body identification information storage unit configured to store body identification information of the remote operation mobile body of a user who has a relation with the user who corresponds to the own remote operation mobile body; an identification location information reception unit configured to receive the identification location information from another remote operation mobile body; a related mobile body presence information generation unit configured to generate related mobile body presence information indicating that the remote operation mobile body of a user who has a relation with the user who corresponds to the own remote operation mobile body is close to the own remote operation mobile body based on the body identification information stored in the other body identification information storage unit and the identification location information received by the identification location information reception unit; and a related mobile body presence information transmission unit configured to transmit the related mobile body presence information to the corresponding remote operation terminal, and each of the remote operation terminals may include: a related mobile body presence information reception unit configured to receive the related mobile body presence information from the corresponding remote operation mobile body; and a related mobile body presence information display unit configured to display the related mobile body presence information. According to the above configuration, it is possible to easily know that a remote operation mobile body of a user who has a relation is close to the own remote operation mobile body.

Each of the remote operation terminals may include: a synchronization request transmission unit configured to transmit a synchronization request to another remote operation terminal; a synchronization request reception unit configured to receive the synchronization request from another remote operation terminal; and a synchronization request approval unit configured to accept an operation of approving the synchronization request received from the other remote operation terminal, and the imaging direction control unit of each of the remote operation mobile bodies may start synchronization processing after the synchronization request is approved. According to the above configuration, the synchronization processing can be performed with a high security.

The imaging direction control unit of each of the remote operation mobile bodies may start synchronization processing after the synchronization request approval unit of the remote operation terminal that corresponds to the own remote operation mobile body has accepted the operation of approving the synchronization request. According to the above configuration, the remote operation mobile body that has transmitted the synchronization request is authorized to determine the imaging direction of the other remote operation mobile body.

Each of the remote operation terminals may further include: a synchronization destination selection unit configured to accept an operation of selecting at least one remote operation mobile body from at least one remote operation mobile body shown in the captured image information displayed on the captured image information display unit; and the synchronization request transmission unit may transmit the synchronization request to a remote operation terminal that corresponds to the at least one remote operation mobile body that has been selected. According to the above configuration, it is possible to intuitively select the other remote operation mobile body to which the synchronization request is transmitted.

The operation control unit may control the operation of the own remote operation mobile body in such a way that the own remote operation mobile body moves following the remote operation mobile body that has transmitted the synchronization request while the imaging direction control unit is executing the synchronization processing. According to the above configuration, while the synchronization processing is being executed, the own remote operation mobile body moves following the remote operation mobile body with which the own remote operation mobile body is synchronized.

The imaging direction control unit may end the synchronization processing after the control command reception unit receives a control command for changing the imaging direction of the imaging unit. According to the above configuration, the imaging direction can be changed to a desired direction anytime while the synchronization processing is being executed.

The imaging direction control unit may return the imaging direction of the imaging unit back to a reference imaging direction after the synchronization processing is ended. According to the above configuration, the gap between the direction of the own remote operation mobile body and the imaging direction of the imaging unit at the time of completion of the synchronization can be eliminated, whereby it is possible to make the operation of the own remote operation mobile body at the time of completion of the synchronization easy.

According to a second aspect of the present disclosure, a remote operation mobile body including: an imaging unit; an imaging direction information reception unit configured to receive, from another remote operation mobile body, imaging direction information indicating an imaging direction of the imaging unit of the other remote operation mobile body; and an imaging direction control unit configured to control the imaging direction of the imaging unit based on the imaging direction information in such a way that the imaging direction of the imaging unit is synchronized with the imaging direction of the imaging unit of the remote operation mobile body that has transmitted the imaging direction information is provided. According to the above configuration, the imaging direction of the imaging unit of the own remote operation mobile body is synchronized with the imaging direction of the imaging unit of the other remote operation mobile body, whereby a plurality of users can smoothly communicate with each other.

According to a third aspect of the present disclosure, a remote operation method in which a plurality of users who are present in locations away from each other remotely operate a plurality of respective remote operation mobile bodies that are located in one place by operating respective remote operation terminals that the plurality of users have, in which each of the remote operation mobile bodies receives a control command from the corresponding remote operation terminal, each of the remote operation mobile bodies controls the operation of the own remote operation mobile body based on the control command, each of the remote operation mobile bodies acquires captured image information from the imaging unit of the own remote operation mobile body, each of the remote operation mobile bodies transmits the captured image information to the corresponding remote operation terminal, each of the remote operation mobile bodies detects an imaging direction of the imaging unit, each of the remote operation mobile bodies generates imaging direction information indicating the detected imaging direction, each of the remote operation mobile bodies transmits the imaging direction information to another remote operation mobile body, each of the remote operation mobile bodies receives the imaging direction information from another remote operation mobile body, each of the remote operation mobile bodies controls the imaging direction of the imaging unit based on the received imaging direction information in such a way that the imaging direction of the imaging unit is synchronized with the imaging direction of the imaging unit of the remote operation mobile body that has transmitted the received imaging direction information, each of the remote operation terminals accepts an operation of inputting the control command, each of the remote operation terminals transmits the control command to the corresponding remote operation mobile body, each of the remote operation terminals receives the captured image information from the corresponding remote operation mobile body, and each of the remote operation terminals displays the captured image information is provided. According to the aforementioned method, the imaging directions of the imaging units of the plurality of remote operation mobile bodies are synchronized with each other, which causes the plurality of remote operation terminals to display the captured images similar to each other, whereby a plurality of users can smoothly communicate with each other.

A program for causing a computer to execute the aforementioned remote operation method is provided.

According to a fourth aspect of the present disclosure, a remote operation system in which a plurality of users who are present in locations away from each other remotely operate a plurality of respective remote operation mobile bodies that are located in one place by operating respective remote operation terminals that the plurality of users have, the remote operation system including: the plurality of remote operation mobile bodies; and the plurality of remote operation terminals, in which each of the remote operation mobile bodies includes: a control command reception unit configured to receive a control command from the corresponding remote operation terminal; an operation control unit configured to control the operation of the own remote operation mobile body based on the control command; an imaging unit; a captured image information acquisition unit configured to acquire captured image information from the imaging unit; a captured image information transmission unit configured to transmit the captured image information to the corresponding remote operation terminal; an imaging direction detection unit configured to detect an imaging direction of the imaging unit; an imaging direction information generation unit configured to generate imaging direction information indicating the imaging direction detected by the imaging direction detection unit; an imaging direction information transmission unit configured to transmit the imaging direction information to another remote operation mobile body; an imaging direction information reception unit configured to receive the imaging direction information from another remote operation mobile body; a differential information generation unit configured to generate differential information, which indicates the difference between the imaging direction information generated by the imaging direction information generation unit and the imaging direction information received by the imaging direction information reception unit; and a differential information transmission unit configured to transmit the differential information to the corresponding remote operation terminal, and each of the remote operation terminals includes: a control command input unit configured to accept an operation of inputting the control command; a control command transmission unit configured to transmit the control command to the corresponding remote operation mobile body; a captured image information reception unit configured to receive the captured image information from the corresponding remote operation mobile body; a captured image information display unit configured to display the captured image information; a differential information reception unit configured to receive the differential information from the corresponding remote operation mobile body; and a differential information display unit configured to display the differential information is provided. According to the above configuration, the user inputs the control command so that the difference indicated by the differential information is eliminated, which causes the imaging directions of the imaging units of the plurality of remote operation mobile bodies to approach each other, as a result of which the captured image information display units of the plurality of remote operation terminals display the captured images similar to each other, whereby a plurality of users can smoothly communicate with each other.

The present disclosure enables a plurality of users who are present in locations away from each other to smoothly communicate with each other when they remotely operate a plurality of respective remote operation mobile bodies that are located in one place by operating respective remote operation terminals that the plurality of users have.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 is a diagram illustrating the content stored in an another robot identification information storage unit (first embodiment);

FIG. 4 is a diagram illustrating identification location information received by an identification location information reception unit (first embodiment);

DESCRIPTION OF EMBODIMENTS

In the midst of the spread of coronavirus, various remote services have been launched. Among them, particular attention has been paid to a remote sightseeing tour, which is a combination of a remote service and sightseeing. The remote sightseeing tour is achieved, for example, by a plurality of users who are present in locations away from each other remotely operating a plurality of respective remote operation robots that are present in one place by operating respective remote operation terminals that the respective users have.

However, it is difficult for each user to know what the other users are currently watching via their remote operation terminals and the remote operation robots. This is because the angle of view of a camera mounted on the remote operation robot is limited. Therefore, many people complain that remote sightseeing tours are not very attractive since they cannot enjoy the real joy of sightseeing, that is, talking to each other and strolling around while watching the same landscape at the same time.

It may be possible to distribute images captured by a camera of one of the remote operation robots to a plurality of remote operation terminals in order to solve the aforementioned problem. In this case, however, it is difficult for users who are provided with video images to feel as if they are actually sightseeing at the tourist spot.

The present disclosure has been made in view of the aforementioned problem and provides a technique capable of enabling a plurality of users who are present in locations away from each other to smoothly communicate with each other when they remotely operate a plurality of respective remote operation mobile bodies that are located in one place by operating respective remote operation terminals that the plurality of users have.

First Embodiment

Hereinafter, with reference to FIGS. 1 to 11, a first embodiment will be described.

Figure 1:
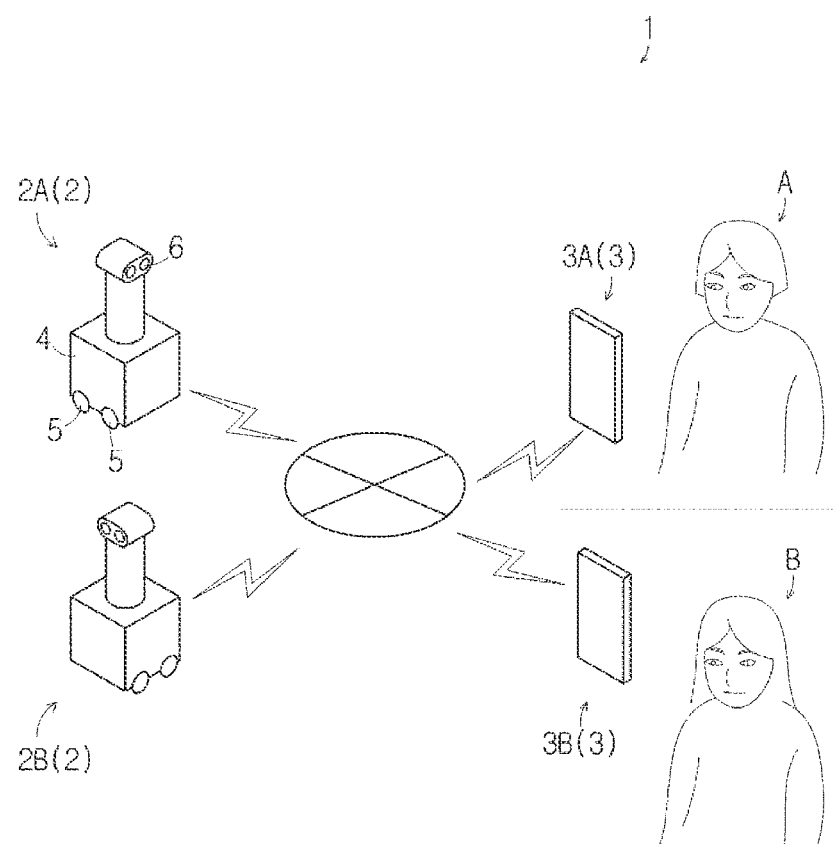
FIG. 1 is a diagram showing a schematic view of a remote sightseeing system (first embodiment)

FIG. 1 shows a remote sightseeing system 1. The remote sightseeing system 1 is one specific example of a remote operation system.

The remote sightseeing system 1 includes a plurality of remote operation robots 2 and a plurality of remote operation terminals 3.

In this embodiment, the plurality of remote operation robots 2 include a remote operation robot 2A and a remote operation robot 2B. The plurality of remote operation robots 2 may include three or more remote operation robots 2.

The remote operation robot 2A and the remote operation robot 2B are located in the same place. That is, the remote operation robot 2A and the remote operation robot 2B are located in the same tourist spot. Typically, the remote operation robot 2A and the remote operation robot 2B are close enough to visually check each other.

In this embodiment, the plurality of remote operation terminals 3 include a remote operation terminal 3A and a remote operation terminal 3B. The plurality of remote operation terminals 3 may include three or more remote operation terminals 3.

The remote operation terminal 3A, which is a terminal that a user A has, is typically a smartphone or a laptop computer that a user A has. The remote operation terminal 3B, which is a terminal that the user B has, is typically a smartphone or a laptop computer that the user B has.

The users A and B typically participate in the same remote sightseeing tour. The users A and B are located away from each other. Typically, the users A and B are far enough away from each other that they cannot visually recognize each other. Therefore, the user A can see neither the user B nor the remote operation terminal 3B used by the user B, and the user B can see neither the user A nor the remote operation terminal 3A used by the user A.

The remote operation terminal 3A, the remote operation terminal 3B, the remote operation robot 2A, and the remote operation robot 2B are configured in such a way that they can communicate with one another via a Wide Area Network (WAN) such as the Internet. However, the remote operation terminal 3A, the remote operation terminal 3B, the remote operation robot 2A, and the remote operation robot 2B may be configured in such a way that they can communicate with one another via a remote sightseeing server (not shown) connected to the WAN.

The user A remotely operates the remote operation robot 2A by operating the remote operation terminal 3A. Likewise, the user B remotely operates the remote operation robot 2B by operating the remote operation terminal 3B.

Further, the users A and B are able to have a conversation via the remote operation terminal 3A, the remote operation terminal 3B, the remote operation robot 2A, and the remote operation robot 2B. Accordingly, the users A and B are able to virtually sightsee the same tourist spot together.

(Remote Operation Robot 2)

The remote operation robot 2 is one specific example of a remote operation mobile body. As shown in FIG. 1, the remote operation robot 2 includes a robot body 4, a plurality of wheels 5, and a camera 6. The plurality of wheels 5 include a driving wheel and a trailing wheel. Alternatively, all the plurality of wheels 5 may be driving wheels. The camera 6 is one specific example of an imaging unit. In this embodiment, the camera 6 is a stereo camera having a distance measuring function. However, the camera 6 may not have a distance measuring function. The camera 6 is configured in such a way that it can swing about the roll axis and the yaw axis with respect to the robot body 4. Accordingly, the imaging direction of the camera 6 can be changed without requiring the remote operation robot 2 to move. Specifically, the azimuth angle and the elevation/depression angle of the imaging direction of the camera 6 can be changed without requiring the remote operation robot 2 to move. The remote operation robot 2 includes a drive unit (not shown) in order to change the imaging direction of the camera 6.

Figure 2:
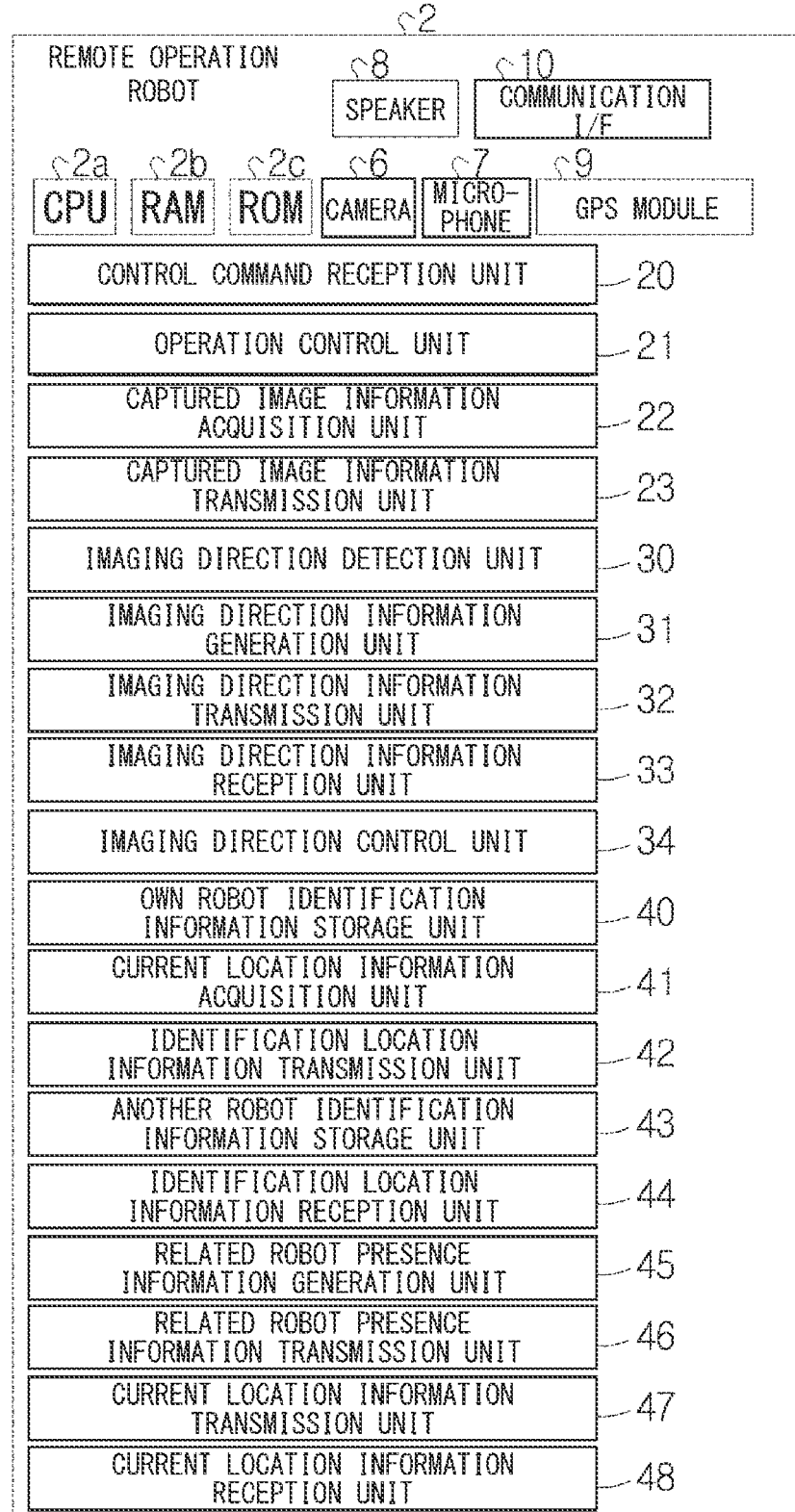
FIG. 2 is a functional block diagram of a remote operation robot (first embodiment)

FIG. 2 shows a functional block diagram of the remote operation robot 2. As shown in FIG. 2, the remote operation robot 2 includes a Central Processing Unit (CPU) 2a, a readable/writable Random Access Memory (RAM) 2b, and a Read Only Memory 2c. The remote operation robot 2 further includes the aforementioned camera 6, a microphone 7, a speaker 8, a Global Positioning System (GPS) module 9, and a communication interface 10.

Then, the CPU 2a loads a control program stored in the ROM 2c and executes the loaded control program, whereby the control program causes hardware such as the CPU 2a to function as various functional units.

The various functional units include a control command reception unit 20, an operation control unit 21, a captured image information acquisition unit 22, a captured image information transmission unit 23, an imaging direction detection unit 30, an imaging direction information generation unit 31, an imaging direction information transmission unit 32, an imaging direction information reception unit 33, an imaging direction control unit 34, an own robot (i.e., body or remote operation mobile body) identification information storage unit 40, a current location information acquisition unit 41, an identification location information transmission unit 42, an another robot identification information storage unit 43, an identification location information reception unit 44, a related robot presence information generation unit 45, a related robot presence information transmission unit 46, a current location information transmission unit 47, and a current location information reception unit 48.

The control command reception unit 20 receives a control command from the corresponding remote operation terminal 3.

The operation control unit 21 controls the operation of the own robot based on the control command. The operation of the own robot includes an operation of moving the own robot by driving the plurality of wheels 5 and an operation of changing the imaging direction of the camera 6. Accordingly, the control command may include one of a moving command for moving the own robot and an imaging direction change command for changing the imaging direction of the camera 6.

The captured image information acquisition unit 22 acquires captured image information from the camera 6.

The captured image information transmission unit 23 transmits the captured image information to the corresponding remote operation terminal 3.

The imaging direction detection unit 30 detects the imaging direction of the camera 6. Specifically, the imaging direction detection unit 30 detects the azimuth angle and the elevation/depression angle of the imaging direction of the camera 6.

The imaging direction information generation unit 31 generates imaging direction information indicating the imaging direction of the camera 6. The imaging direction information is information indicating the azimuth angle and the elevation/depression angle of the imaging direction of the camera 6.

The imaging direction information transmission unit 32 transmits the imaging direction information to another remote operation robot 2.

The imaging direction information reception unit 33 receives the imaging direction information from another remote operation robot 2.

The imaging direction control unit 34 controls the imaging direction of the camera 6 of the own robot based on the imaging direction information received by the imaging direction information reception unit 33 in such a way that the imaging direction of the camera 6 of the own robot is synchronized with the imaging direction of the camera 6 of the remote operation robot 2 that has transmitted the imaging direction information received by the imaging direction information reception unit 33. The aforementioned control performed by the imaging direction control unit 34 may be hereinafter simply referred to as synchronization control or synchronization processing. The phrase "in such a way that the imaging direction of the camera 6 of the own robot is synchronized with the imaging direction of the camera 6 of the remote operation robot 2 that has transmitted the imaging direction information received by the imaging direction information reception unit 33" means "in such a way that the azimuth angle and the elevation/depression angle of the imaging direction of the camera 6 of the own robot is synchronized with the azimuth angle and the elevation/depression angle of the imaging direction of the camera 6 of the remote operation robot 2 that has transmitted the imaging direction information received by the imaging direction information reception unit 33". The phrase "synchronized with" may include some time lag, which is due to a communication delay or a processing delay.

The own robot identification information storage unit 40 stores robot identification information of the own robot. The robot identification information of the own robot is information for differentiating the own robot from other robots.

The current location information acquisition unit 41 acquires current location information indicating the current location of the own robot using the GPS module 9. The GPS module 9 is one specific example of a Global Navigation Satellite System (GNSS) module. Other specific examples of the GNSS module include a Galileo module, a BeiDou module, a Quasi-Zenith Satellite System (QZSS) module.

The identification location information transmission unit 42 transmits identification location information including the robot identification information and the current location information to another remote operation robot 2. The identification location information transmission unit 42 may transmit the identification location information to another remote operation robot 2 via the WAN, transmit the identification location information to another remote operation robot 2 via a remote sightseeing server, or transmit the identification location information to another remote operation robot 2 via Near field communication (NFC) such as Bluetooth (registered trademark) or Wi-Fi (registered trademark). The identification location information transmission unit 42 according to this embodiment transmits, as one example, the identification location information to another remote operation robot 2 via near field communication.

The other robot identification information storage unit 43 stores robot identification information of the remote operation robot 2 of a user who has a relation with the user who corresponds to the own robot. FIG. 3 illustrates the content stored in the other robot identification information storage unit 43 of the remote operation robot 2A. As shown in FIG. 3, the user A has a relation with users B, D, R, and Z. For example, the user A and the users B, D, R, and Z "know each other" or they are "friends". In this case, in this embodiment, the other robot identification information storage unit 43 stores the name of the user who has a relation with the user who corresponds to the own robot in association with the robot identification information of the remote operation robot 2 that the user remotely operates. The other robot identification information storage unit 43 may store user identification information of the user who has a relation with the user who corresponds to the own robot in association with the robot identification information of the remote operation robot 2 that the user remotely operates.

The identification location information reception unit 44 receives the identification location information from the identification location information transmission unit 42 of another remote operation robot 2, and stores the received identification location information in the RAM 2b. FIG. 4 illustrates the identification location information received by the identification location information reception unit 44. As shown in FIG. 4, the identification location information reception unit 44 receives, as one example, the identification location information from the remote operation robot 2 (robot ID: 8231) that the user B remotely operates and a remote operation robot 2 (robot ID: 2341).

The related robot presence information generation unit 45 generates related robot presence information indicating that the remote operation robot 2 of the user who has a relation with the user who corresponds to the own robot is close to the own robot based on the robot identification information stored in the other robot identification information storage unit 43 (see FIG. 3) and the identification location information received by the identification location information reception unit 44 (FIG. 4). Specifically, the related robot presence information generation unit 45 compares the current location information of all the pieces of identification location information received by the identification location information reception unit 44 with the current location information of the own robot acquired by the current location information acquisition unit 41 and calculates the distance between the other robot and the own robot. When the calculated distance is within a predetermined distance, the related robot presence information generation unit 45 typically determines that the corresponding remote operation robot 2 is near the own robot. It is assumed, in this embodiment, that the remote operation robot 2 (robot ID: 8231) and the remote operation robot 2 (robot ID: 2341) are both located near the own robot. The related robot presence information generation unit 45 determines that the remote operation robot 2 of the user (user B) who has a relation with the user who corresponds to the own robot is located near the own robot by referring to the robot identification information stored in the other robot identification information storage unit 43 shown in FIG. 3. Accordingly, the related robot presence information generation unit 45 generates related robot presence information indicating that the remote operation robot 2 of the user (user B) who has a relation with the user who corresponds to the own robot is close to the own robot. The related robot presence information typically includes the user name of the corresponding user, robot identification information of the remote operation robot 2 of the corresponding user, and the current location information of the remote operation robot 2 of the corresponding user.

The related robot presence information transmission unit 46 transmits the related robot presence information generated by the related robot presence information generation unit 45 to the corresponding remote operation terminal 3.

(Remote Operation Terminal 3)

Figure 5:
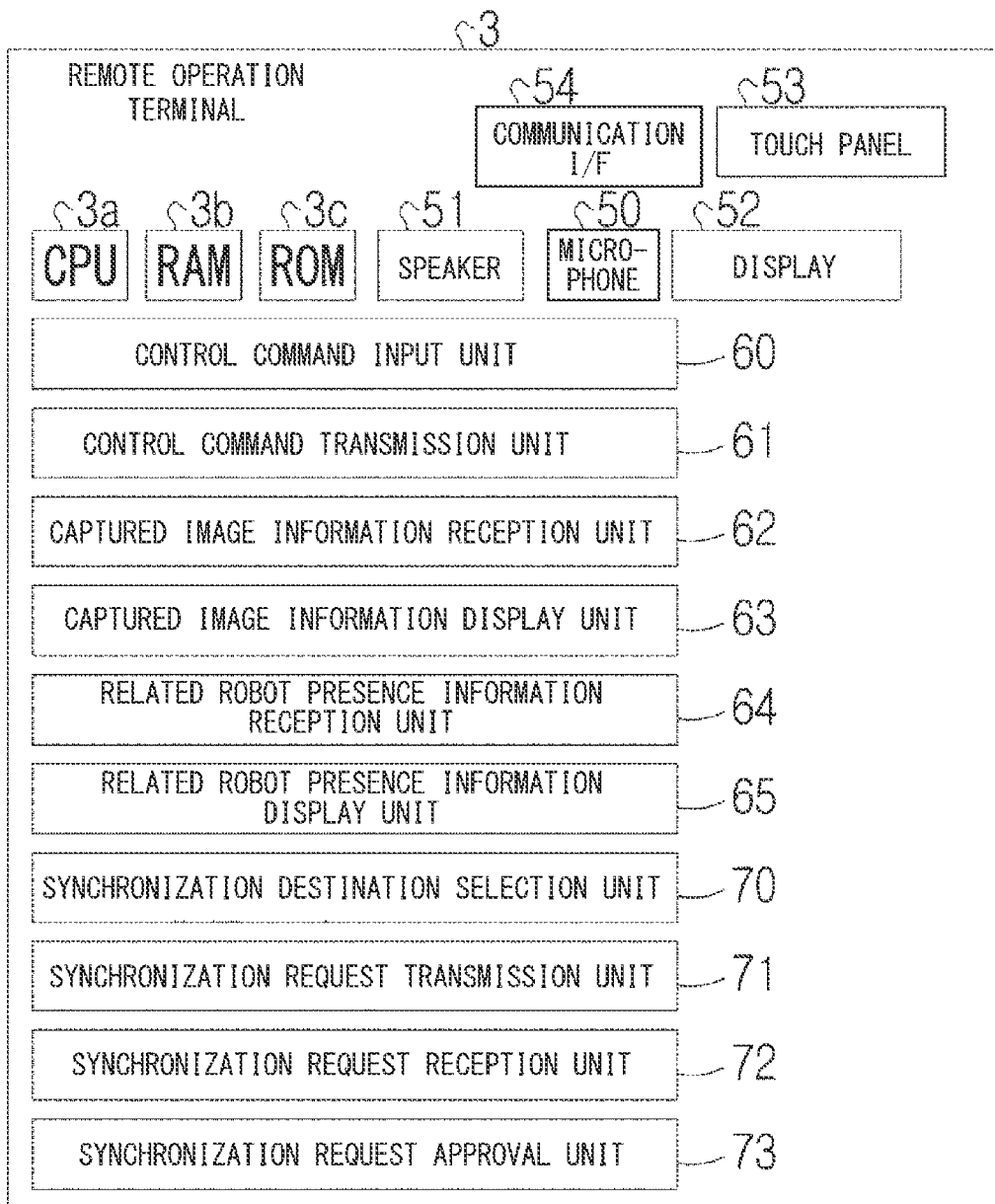
FIG. 5 is a functional block diagram of a remote operation terminal (first embodiment)

Referring next to FIG. 5, the remote operation terminal 3 will be described. As shown in FIG. 5, the remote operation terminal 3 includes a Central Processing Unit (CPU) 3a, a readable/writable Random Access Memory (RAM) 3b, and a Read Only Memory (ROM) 3c. The remote operation terminal 3 further includes a microphone 50, a speaker 51, a display 52, a touch panel 53, and a communication interface 54. The display 52 and the touch panel 53 are provided in such a way that they are superimposed on each other. Then, the CPU 3a loads a control program stored in the ROM 3c and executes the loaded control program, whereby the control program causes hardware such as the CPU 3a to function as various functional units.

The various functional units include a control command input unit 60, a control command transmission unit 61, a captured image information reception unit 62, a captured image information display unit 63, a related robot presence information reception unit 64, a related robot presence information display unit 65, a synchronization destination selection unit 70, a synchronization request transmission unit 71, a synchronization request reception unit 72, and a synchronization request approval unit 73.

Figure 6:
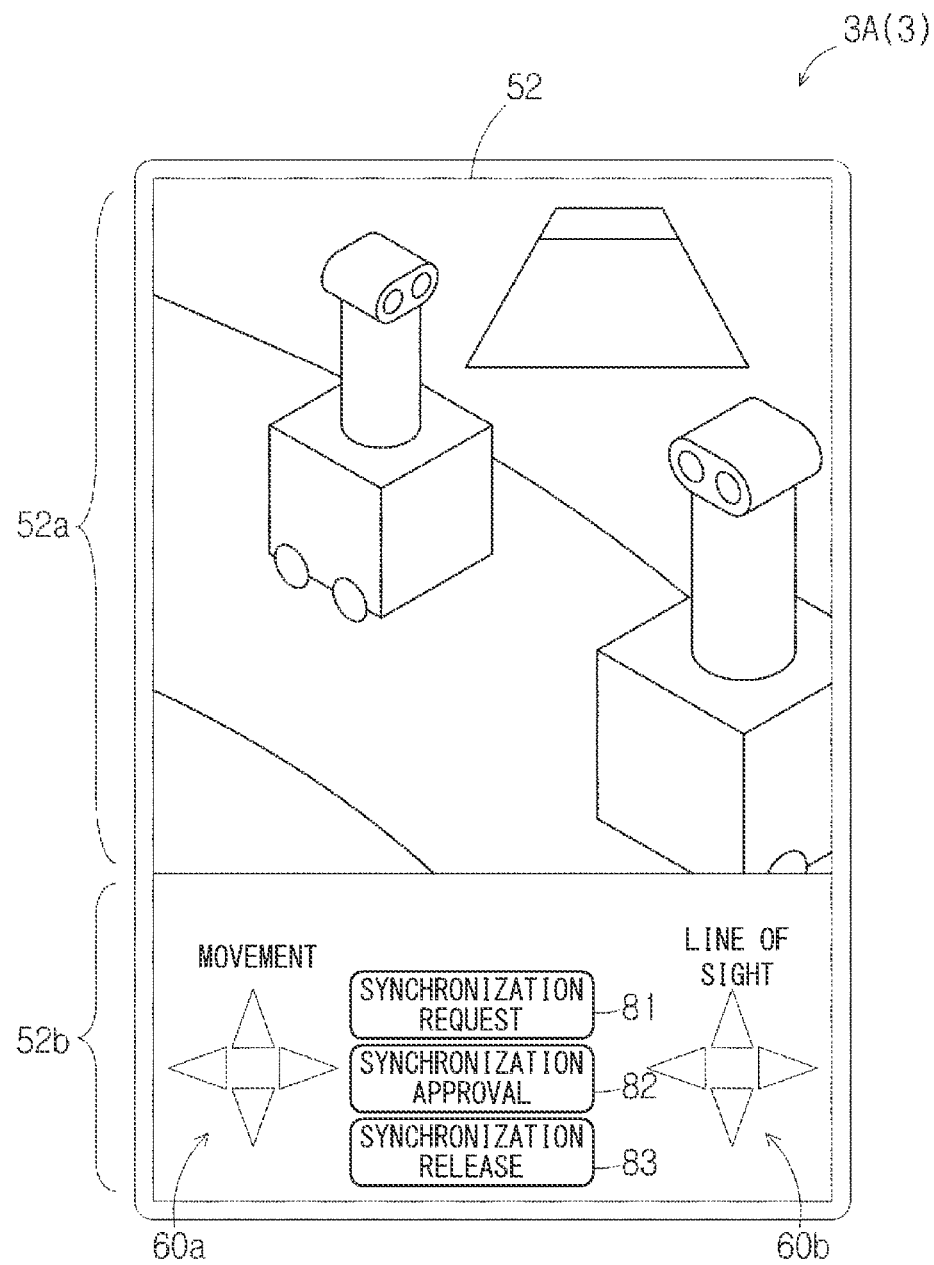
FIG. 6 is a diagram showing an example of the content displayed on a display of the remote operation terminal (first embodiment)

The control command input unit 60 accepts an operation of inputting a control command by the user. FIG. 6 shows a display example of the display 52 of the remote operation terminal 3. As shown in FIG. 6, the display screen of the display 52 includes an information display region 52a and an input region 52b. The control command input unit 60 displays various kinds of buttons for enabling the user to input control commands in the input region 52b. The various kinds of buttons include a four-direction button for moving 60a for enabling the user to input a moving command and a four-direction button for image capturing 60b for enabling the user to input an imaging direction change command. The control command input unit 60 accepts the operation of inputting the control command by the user by detecting that the four-direction button for moving 60a and the four-direction button for image capturing 60b have been tapped.

The remote operation terminal 3 further displays a synchronization request button 81, a synchronization approval button 82, and a synchronization release button 83 in the input region 52b.

The control command transmission unit 61 transmits the control command input by the user to the corresponding remote operation robot 2.

The captured image information reception unit 62 receives the captured image information from the corresponding remote operation robot 2.

As shown in FIG. 6, the captured image information display unit 63 displays the captured image information received by the captured image information reception unit 62 in the information display region 52a of the display 52.

The related robot presence information reception unit 64 receives the related robot presence information from the corresponding remote operation robot 2.

The related robot presence information display unit 65 displays the related robot presence information received by the related robot presence information reception unit 64 on the display 52.

The synchronization destination selection unit 70 accepts an operation in which the user selects at least one remote operation robot 2 from the at least one remote operation robot 2 shown in the captured image information that the captured image information display unit 63 displays in the information display region 52a of the display 52. Specifically, the synchronization destination selection unit 70 detects which one of the remote operation robots 2 the user has selected based on the coordinates of the part on the touch panel 53 that the user has tapped.

The synchronization request transmission unit 71 transmits a synchronization request to another remote operation terminal 3. Specifically, the synchronization request transmission unit 71 transmits the synchronization request to the remote operation terminal 3 that corresponds to the remote operation robot 2 that has been selected by the user.

The synchronization request reception unit 72 receives a synchronization request from another remote operation terminal 3.

The synchronization request approval unit 73 accepts the operation of approving the synchronization request received from the other remote operation terminal 3 by the user. Specifically, as shown in FIG. 6, the synchronization request approval unit 73 determines whether the synchronization approval button 82 has been tapped. When it is determined that the synchronization approval button 82 has been tapped, the synchronization request approval unit 73 determines that the user has approved the synchronization request received from the other remote operation terminal 3.

As shown in FIG. 2, each of the remote operation robots 2 includes the microphone 7 and the speaker 8. Further, as shown in FIG. 5, each of the remote operation terminals 3 includes the microphone 50 and the speaker 51. Therefore, when each user talks in the microphone 50 of the remote operation terminal 3 that the user has, a voice signal generated by the microphone 50 is transmitted to the corresponding remote operation robot 2 and is output from the speaker 8. The voice signal output from the speaker 8 is transmitted through the air as an acoustic wave that vibrates the air, picked up by the microphone 7 of the other robot, and is then converted into a voice signal. The voice signal is transmitted to the remote operation terminal 3 that corresponds to the other robot and is output from the speaker 51 of the corresponding remote operation terminal 3. This enables the users A and B to make a conversation via the remote operation terminal 3A, the remote operation terminal 3B, the remote operation robot 2A, and the remote operation robot 2B.

Figure 7:
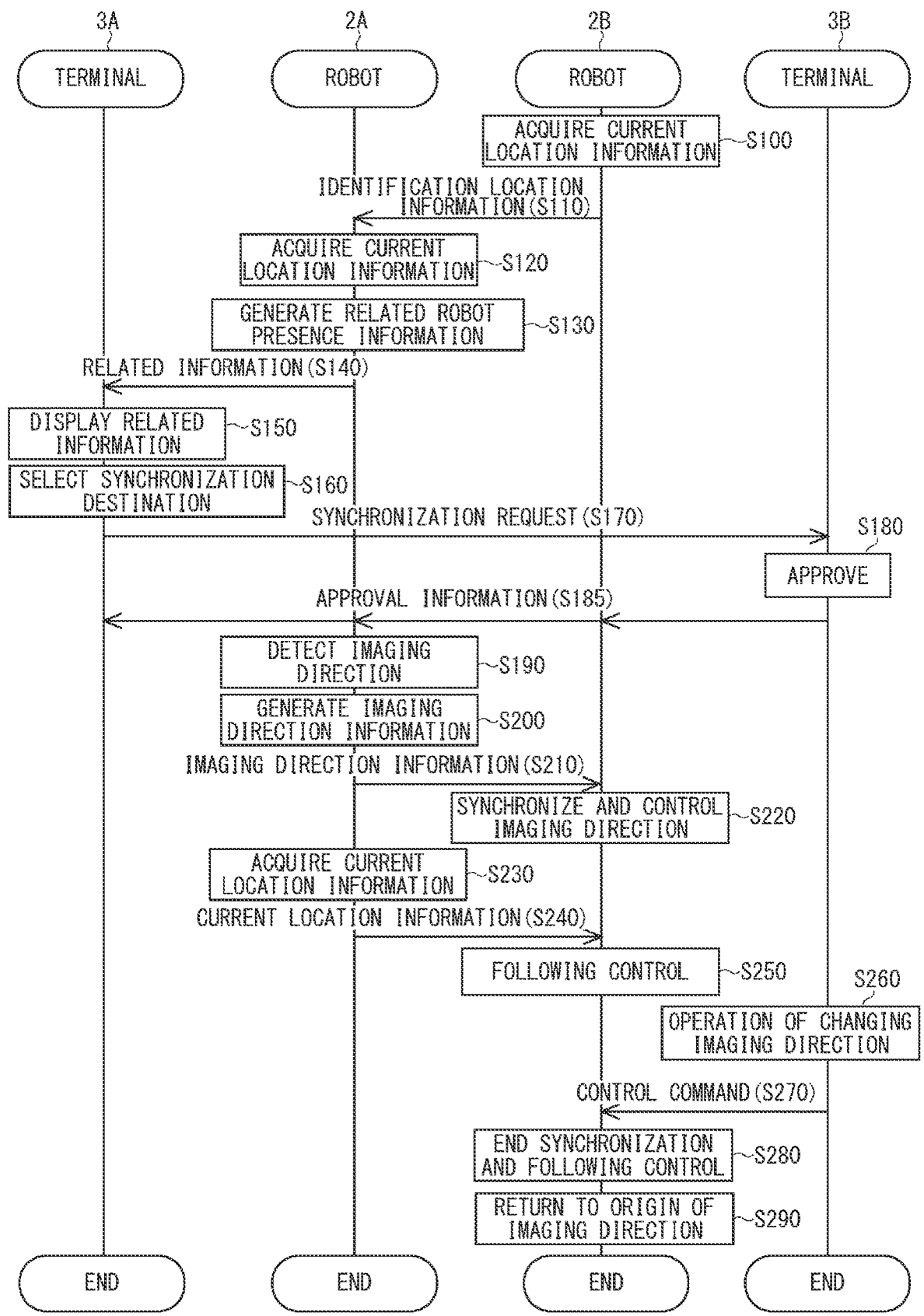
FIG. 7 is a sequence diagram of a remote sightseeing system (first embodiment)

Referring next to FIG. 7, an operation flow of the remote sightseeing system 1 will be described. FIG. 7 shows a sequence diagram of the remote sightseeing system 1. In the following, for the sake of convenience of the description, it is assumed that the remote operation robot 2A and the remote operation robot 2B are located close to each other in the same tourist spot. It is further assumed that the users A and B know each other. It is further assumed that the user A requests the user B to see the landscape the same as the landscape the user A is seeing.

S100:

First, the current location information acquisition unit 41 of the remote operation robot 2B acquires the current location information of the own robot.

S110:

Next, the identification location information transmission unit 42 of the remote operation robot 2B generates identification location information including the robot identification information and the current location information of the own robot and transmits the generated identification location information to another remote operation robot 2.

Next, the identification location information reception unit 44 of the remote operation robot 2A receives the identification location information from the remote operation robot 2B and stores the received identification location information in the RAM 2b.

The identification location information reception unit 44 of the remote operation robot 2A receives identification location information also from a remote operation robot 2 other than the remote operation robot 2B and stores the received identification location information in the RAM 2b.

As a result, as shown in FIG. 4, the RAM 2b of the remote operation robot 2A stores two pieces of identification location information received from the two respective remote operation robots 2.

S120:

Next, the current location information acquisition unit 41 of the remote operation robot 2A acquires the current location information of the own robot.

S130:

Next, the related robot presence information generation unit 45 of the remote operation robot 2A generates related robot presence information indicating that the remote operation robot 2 of a user who has a relation with the user who corresponds to the own robot is close to the own robot based on the robot identification information stored in the other robot identification information storage unit 43 (see FIG. 3) and the identification location information received by the identification location information reception unit 44 (FIG. 4). Specifically, the related robot presence information generation unit 45 compares the robot identification information stored in the other robot identification information storage unit 43 (see FIG. 3) with the identification location information received by the identification location information reception unit 44 (FIG. 4) and extracts the identification location information whose robot identification information overlap each other from the identification location information received by the identification location information reception unit 44 (FIG. 4). That is, the related robot presence information generation unit 45 extracts one of the two pieces of identification location information shown in FIG. 4 that corresponds to the user B. Then, the related robot presence information generation unit 45 compares the current location information included in the identification location information that corresponds to the user B extracted by the related robot presence information generation unit 45 with the current location information of the own robot, and determines whether the remote operation robot 2B is present within a predetermined distance from the own robot. When it is determined that the remote operation robot 2B is present within a predetermined distance from the own robot, the related robot presence information generation unit 45 generates the related robot presence information including the identification location information that corresponds to the user B.

S140:

Next, the related robot presence information transmission unit 46 of the remote operation robot 2A transmits the related robot presence information to the remote operation terminal 3A.

The related robot presence information reception unit 64 of the remote operation terminal 3A receives the related robot presence information from the remote operation robot 2A.

Figure 8:
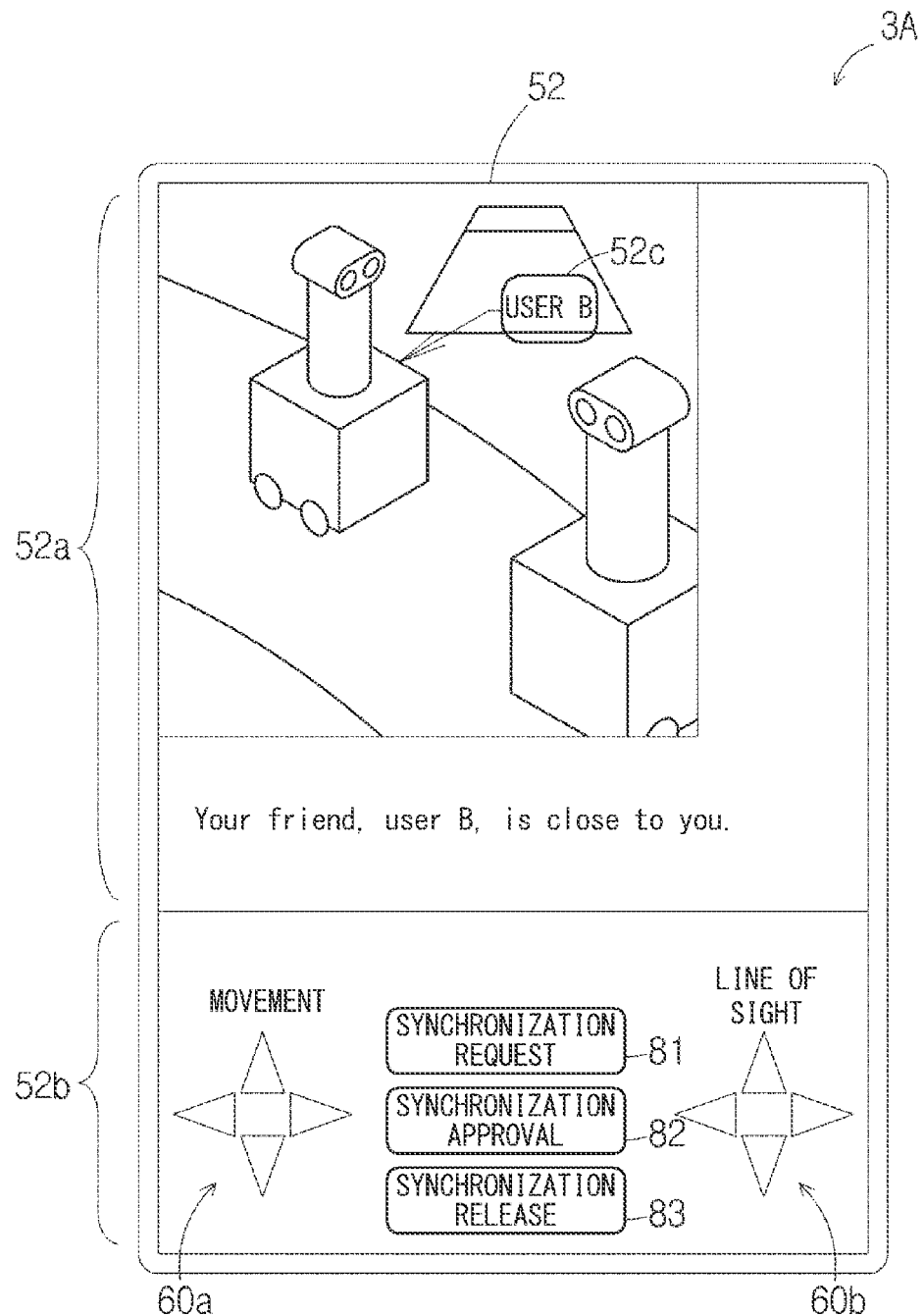
FIG. 8 is a diagram showing an example of the content displayed on the display of the remote operation terminal (first embodiment)

S150:

Next, the related robot presence information display unit 65 of the remote operation terminal 3A displays the related robot presence information received by the related robot presence information reception unit 64 on the display 52. FIG. 8 shows a state in which the related robot presence information display unit 65 displays the related robot presence information in the information display region 52a of the display 52. As shown in FIG. 8, the related robot presence information display unit 65 refers to the other robot identification information storage unit 43 to acquire the user name that corresponds to the robot identification information included in the related robot presence information, generates a text message such as "Your friend, user B, is close to you.", and displays this text message in the information display region 52a of the display 52. Further, when the remote operation robot 2B that corresponds to the user B is displayed on the display 52, an icon 52c with which the remote operation robot 2B can be specified in the display 52 may be superimposed on the captured image information displayed on the display 52.

Whether or not the remote operation robot 2 displayed on the display 52 corresponds to the remote operation robot 2B can be determined, for example, as follows. First, the remote operation robot 2 displayed on the display 52 is detected by a known object detection technique such as Faster R-CNN, YOLO, or SSD. Based on the position and the size of the bounding box generated by object detection, the current location information of the own robot, and imaging conditions including the imaging direction of the camera 6 of the own robot, the current location information of the remote operation robot 2 that has been detected is generated. When this current location information is compared with the current location information received from the remote operation robot 2B and the difference between them is equal to or smaller than a predetermined value, it can be determined that the remote operation robot 2 displayed on the display 52 corresponds to the remote operation robot 2B. Alternatively, a QR code (registered mark) may be, for example, provided in the robot body 4 of each of the remote operation robots 2, and may be determined whether or not the remote operation robot 2 displayed on the display 52 corresponds to the remote operation robot 2B by reading out the QR code.

Figure 9:
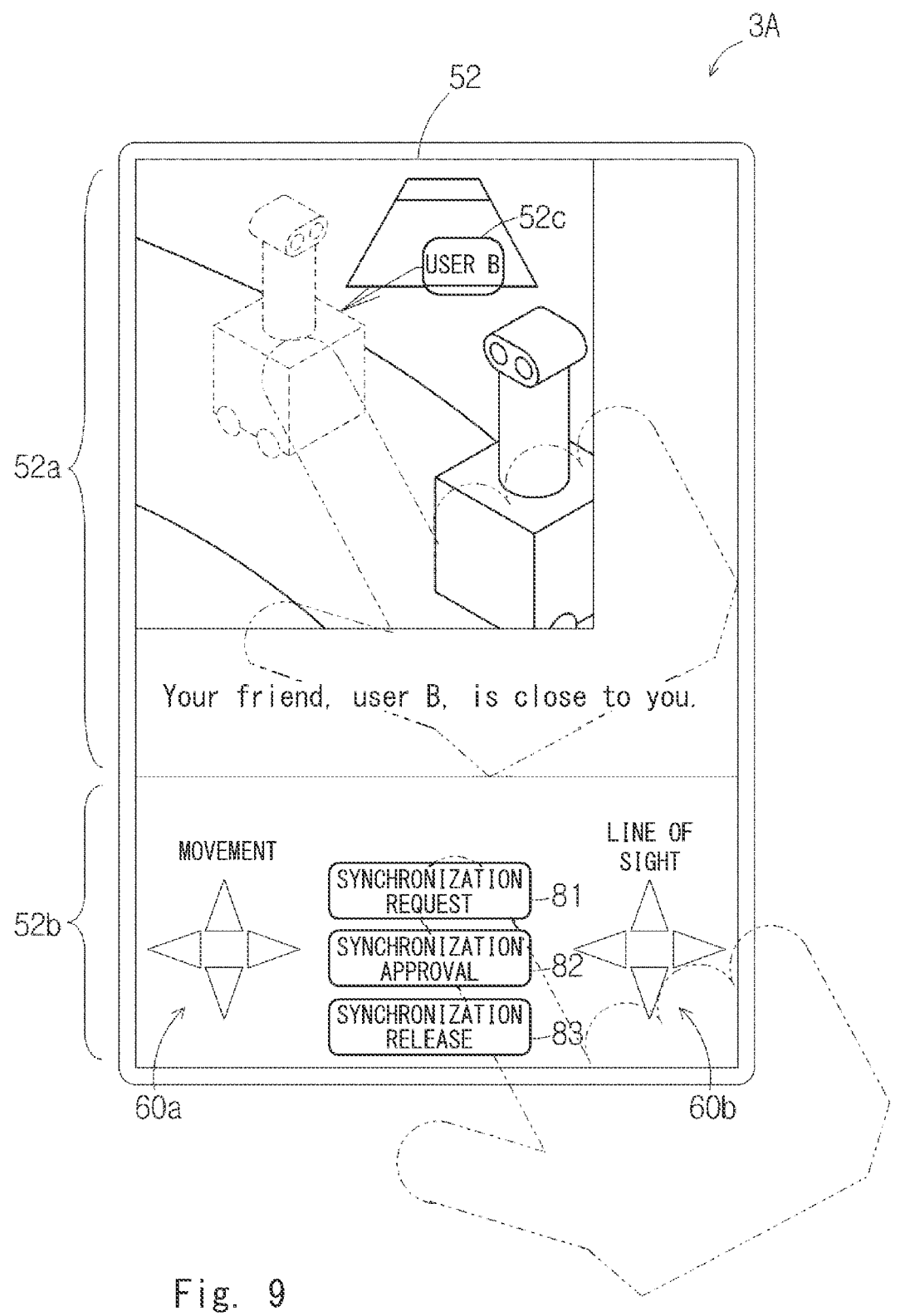
FIG. 9 is a diagram showing an example of the content displayed on the display of the remote operation terminal (first embodiment)

S160:

Next, as shown in FIG. 9, the user A taps the remote operation robot 2B displayed on the display 52. Then, the synchronization destination selection unit 70 of the remote operation terminal 3A determines that the remote operation robot 2B has been selected from the plurality of remote operation robots 2 displayed on the display 52 based on the coordinates of the part where the user A has tapped.

S170:

The user A then taps the synchronization request button 81. Then, the synchronization request transmission unit 71 of the remote operation terminal 3A transmits a synchronization request to the remote operation terminal 3B. Further, the synchronization request reception unit 72 of the remote operation terminal 3B receives the synchronization request from the remote operation terminal 3A.

Figure 10:
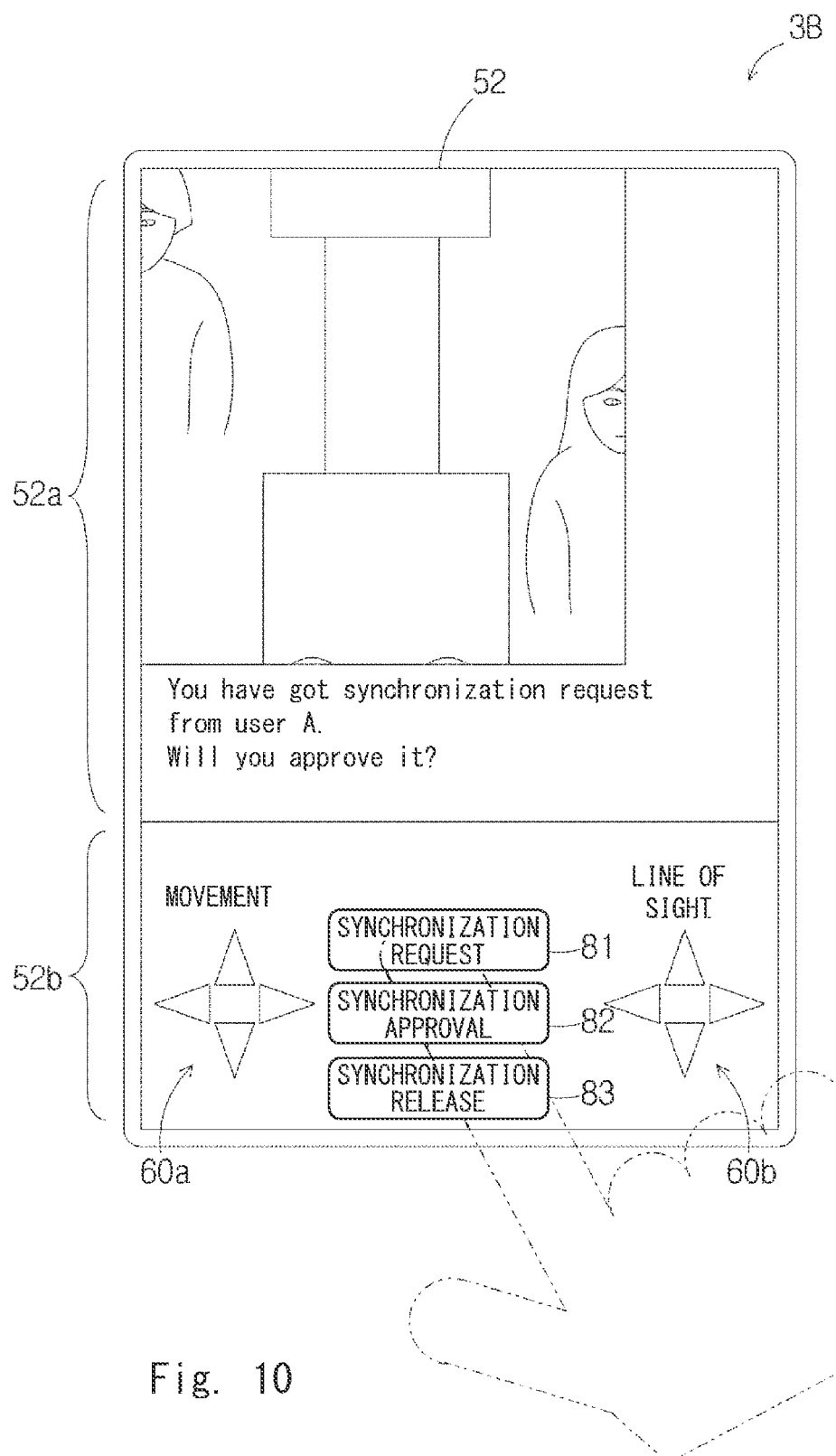
FIG. 10 is a diagram showing an example of the content displayed on the display of the remote operation terminal (first embodiment)

S180:

Next, as shown in FIG. 10, the synchronization request approval unit 73 of the remote operation terminal 3B displays information indicating that the synchronization request has been received from the remote operation terminal 3A in the information display region 52a of the display 52. Next, the user B taps the synchronization approval button 82. Then, the synchronization request approval unit 73 determines that the user B has approved the synchronization request. Then, the synchronization request approval unit 73 transmits approval information indicating that the synchronization request from the user A to the user B has been approved to the remote operation robot 2B, the remote operation robot 2A, and the remote operation terminal 3A (S185).

S190:

Next, the imaging direction detection unit 30 of the remote operation robot 2A detects the imaging direction of the camera 6 of the own robot.

S200:

Next, the imaging direction information generation unit 31 of the remote operation robot 2A generates the imaging direction information indicating the imaging direction of the camera 6 of the own robot.

S210:

Next, the imaging direction information transmission unit 32 of the remote operation robot 2A transmits the imaging direction information to the remote operation robot 2B. The imaging direction information reception unit 33 of the remote operation robot 2B receives the imaging direction information from the remote operation robot 2A.

Figure 11:
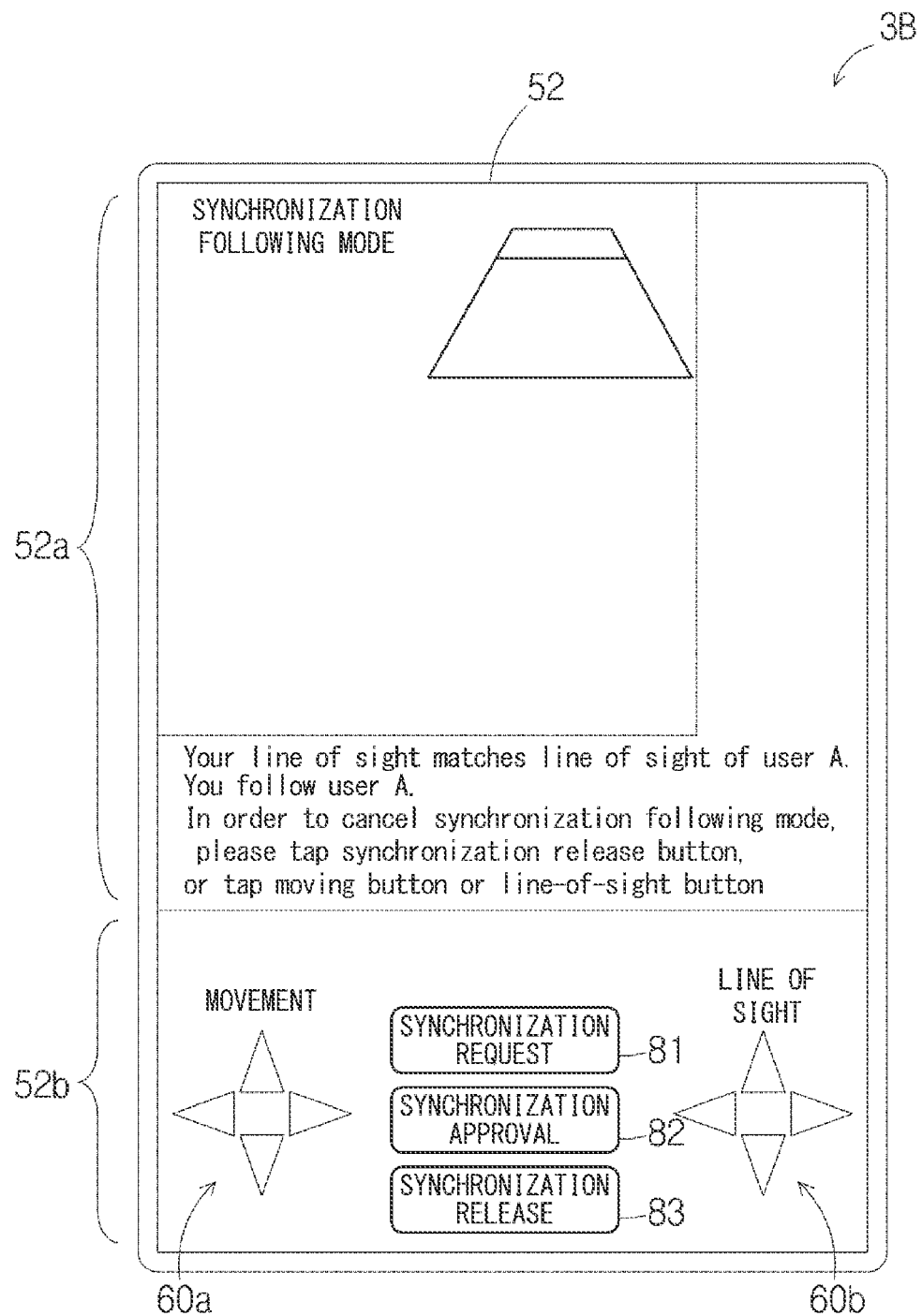
FIG. 11 is a diagram showing an example of the content displayed on the display of the remote operation terminal (first embodiment)

S220:

Next, the imaging direction control unit 34 of the remote operation robot 2B controls the imaging direction of the camera 6 of the own robot based on the imaging direction information received by the imaging direction information reception unit 33 in such a way that the imaging direction of the camera 6 of the own robot is synchronized with the imaging direction of the camera 6 of the remote operation robot 2A, which is the robot that has transmitted the imaging direction information received by the imaging direction information reception unit 33. Then, the imaging direction of the camera 6 of the remote operation robot 2B coincides with the imaging direction of the camera 6 of the remote operation robot 2A, whereby, as shown in FIG. 11, the information display region 52a of the display 52 of the remote operation terminal 3B displays a landscape that is the same as the landscape that the user A is seeing via the remote operation terminal 3A.

In the following, the processing from Step S190 to Step S220 is repeated until the synchronization processing by the imaging direction control unit 34 of the remote operation robot 2B is ended.

S230:

Further, the current location information acquisition unit 41 of the remote operation robot 2A acquires the current location information of the own robot.

S240:

Next, the current location information transmission unit 47 of the remote operation robot 2A transmits the current location information to the remote operation robot 2B. The current location information reception unit 48 of the remote operation robot 2B receives the current location information from the remote operation robot 2A.

S250:

Then, the operation control unit 21 of the remote operation robot 2B controls the operation of the own robot in such a way that the own robot moves following the remote operation robot 2A that has transmitted the synchronization request while the imaging direction control unit 34 is executing synchronization processing.

S260-S270:

After the user B operates the four-direction button for image capturing 60b of the remote operation terminal 3B (S260), the remote operation terminal 3B transmits an imaging direction change command to the remote operation robot 2B (S270). The control command reception unit 20 of the remote operation robot 2B receives the imaging direction change command from the remote operation terminal 3B (S270).

S280:

After the above imaging direction change command is received, the imaging direction control unit 34 and the operation control unit 21 of the remote operation robot 2B ends the synchronization control (S220) and the following control (S250). In a case in which the remote operation terminal 3B has transmitted a synchronization release command to the remote operation robot 2B by the user B tapping the synchronization release button 83 of the remote operation terminal 3B as well, the imaging direction control unit 34 and the operation control unit 21 end the synchronization control (S220) and the following control (S250).

S290:

After the synchronization processing is ended, the imaging direction control unit 34 of the remote operation robot 2B returns the imaging direction of the camera 6 back to the reference imaging direction. The reference imaging direction is typically a direction that is defined based on the arrangement of the plurality of wheels 5 shown in FIG. 1. The reference imaging direction may be, for example, a direction that is perpendicular to the axle of the plurality of wheels 5 in a plan view.

The first embodiment has been described above. The aforementioned embodiment includes the following features.

The remote sightseeing system 1 is a system in which a plurality of users who are present in locations away from each other remotely operate a plurality of remote operation robots 2 (remote operation mobile bodies) that are present in one place by operating the respective remote operation terminals 3 that they have. The remote sightseeing system 1 includes the plurality of remote operation robots 2 and the plurality of remote operation terminals 3. Each of the remote operation robots 2 includes the control command reception unit 20 configured to receive the control command from the corresponding remote operation terminal 3, the operation control unit 21 configured to control the operation of the own robot based on the control command, the camera 6 (imaging unit), the captured image information acquisition unit 22 configured to acquire the captured image information from the camera 6, the captured image information transmission unit 23 configured to transmit the captured image information to the corresponding remote operation terminal 3, the imaging direction detection unit 30 configured to detect the imaging direction of the camera 6, the imaging direction information generation unit 31 configured to generate the imaging direction information indicating the imaging direction detected by the imaging direction detection unit 30, the imaging direction information transmission unit 32 configured to transmit the imaging direction information to another remote operation robot 2, the imaging direction information reception unit 33 configured to receive the imaging direction information from another remote operation robot 2, and the imaging direction control unit 34 configured to control the imaging direction of the camera 6 based on the imaging direction information received by the imaging direction information reception unit 33 in such a way that the imaging direction of the camera 6 of the own robot is synchronized with the imaging direction of the camera 6 of the remote operation robot 2 that has transmitted the imaging direction information received by the imaging direction information reception unit 33. Each of the remote operation terminals 3 includes the control command input unit 60 configured to accept the operation of inputting the control command, the control command transmission unit 61 configured to transmit the control command to the corresponding remote operation robot 2, the captured image information reception unit 62 configured to receive the captured image information from the corresponding remote operation robot 2, and the captured image information display unit 63 configured to display the captured image information. According to the above configuration, the imaging directions of the cameras 6 of the plurality of remote operation robots 2 are synchronized with each other, which causes the captured image information display units 63 of the plurality of respective remote operation terminals 3 to display captured images similar to each other on the display 52, whereby a plurality of users can smoothly communicate with each other.

The imaging direction information includes information indicating the azimuth angle and the elevation/depression angle of the imaging direction of the camera 6. According to the above configuration, the imaging direction control unit 34 is able to smoothly execute synchronization processing.

Each of the remote operation robots 2 further includes the own robot identification information storage unit 40 that stores the robot identification information of the own robot, the current location information acquisition unit 41 configured to acquire the current location information, the identification location information transmission unit 42 configured to transmit the identification location information including the robot identification information and the current location information to another remote operation robot 2, the other robot identification information storage unit 43 configured to store the robot identification information of the remote operation robot 2 of the user who has a relation with the user who corresponds to the own robot, the identification location information reception unit 44 configured to receive the identification location information from another remote operation robot 2, the related robot presence information generation unit 45 (related mobile body presence information generation unit) configured to generate the related robot presence information (related mobile body presence information) indicating that the remote operation robot 2 of the user who has a relation with the user that corresponds to the own robot is close to the own robot based on the robot identification information stored in the other robot identification information storage unit 43 and the identification location information received by the identification location information reception unit 44, and the related robot presence information transmission unit 46 (related mobile body presence information transmission unit) that transmits the related robot presence information to the corresponding remote operation terminal 3. Each of the remote operation terminals 3 includes the related robot presence information reception unit 64 (related mobile body presence information reception unit) that receives the related robot presence information from the corresponding remote operation robot 2, and the related robot presence information display unit 65 (related mobile body presence information display unit) configured to display the related robot presence information. According to the above configuration, it is possible to easily know that the remote operation robot 2 of the user who has a relation is close to the own remote operation robot 2.

Each of the remote operation terminals 3 further includes the synchronization request transmission unit 71 that transmits a synchronization request to another remote operation terminal 3, the synchronization request reception unit 72 that receives a synchronization request from another remote operation terminal 3, and the synchronization request approval unit 73 that accepts an operation of approving the synchronization request received from the other remote operation terminal 3. The imaging direction control unit 34 of each of the remote operation robots 2 starts the synchronization processing after the synchronization request has been approved. According to the above configuration, the synchronization processing can be performed with a high security.

The imaging direction control unit 34 of each of the remote operation robots 2 starts the synchronization processing after the synchronization request approval unit 73 of the remote operation terminal 3 that corresponds to the own robot accepts the operation of approving the synchronization request. According to the above configuration, the transmission side that has transmitted the synchronization request is authorized to determine the imaging direction of the other robot.

Alternatively, the reception side that has received the synchronization request may be authorized to determine the imaging direction of the other robot or both the reception side and the transmission side may be authorized to determine the imaging direction of the other robot.

Each of the remote operation terminals 3 further includes the synchronization destination selection unit 70 that accepts the operation of selecting at least one remote operation robot 2 from at least one remote operation robot 2 shown in the captured image information displayed on the captured image information display unit 63. The synchronization request transmission unit 71 transmits a synchronization request to the remote operation terminal 3 that corresponds to at least one remote operation robot 2 that has been selected. According to the above configuration, it is possible to intuitively select the other robot to which the synchronization request is transmitted.

The imaging direction control unit 34 ends the synchronization processing after the control command reception unit 20 receives a control command (imaging direction change command) to change the imaging direction of the camera 6. According to the above configuration, the imaging direction can be changed to a desired direction anytime while the synchronization processing is being executed. Furthermore, it is possible for the users to intuitively turn away from a landscape they do not want to see.

The operation control unit 21 controls the operation of the own robot in such a way that this own robot moves following the remote operation robot 2 that has transmitted the synchronization request while the imaging direction control unit 34 is executing synchronization processing. According to the above configuration, while the synchronization processing is being executed, the own robot moves following the remote operation robot 2 with which the own robot is synchronized, which enables the users to feel that they share the same experience.

Alternatively, a desired one of a plurality of remote operation robots 2 that relate to the synchronization processing may be followed by the other remote operation robots 2.

The imaging direction control unit 34 returns the imaging direction of the camera 6 back to the reference imaging direction after the synchronization processing is ended. According to the above configuration, the gap between the direction of the own robot and the imaging direction of the camera 6 at the time of completion of the synchronization can be eliminated, which makes the operation of moving the own robot at the time of completion of the synchronization easy.

Alternatively, the imaging direction control unit 34 may return the imaging direction of the camera 6 back to the reference imaging direction after a predetermined period of time has passed since the end of the synchronization processing. Further, the imaging direction control unit 34 may return the imaging direction of the camera 6 back to the reference imaging direction after the synchronization processing is ended and the conversation between users is ended.

Further, while the imaging direction control unit 34 is performing the synchronization processing, the four-direction button for image capturing 60b may not be displayed. Such a control as to ignore an operation of the four-direction button for image capturing 60b may be performed.

Further, the remote operation robot 2 includes the camera 6, the imaging direction information reception unit 33 configured to receive the imaging direction information indicating the imaging direction of the camera 6 of another remote operation robot 2 from the other remote operation robot 2, and the imaging direction control unit 34 that controls the imaging direction of the camera 6 of the own robot based on the imaging direction information in such a way that the imaging direction of the camera 6 of the own robot is synchronized with the imaging direction of the camera 6 of the remote operation robot 2 that has transmitted the imaging direction information. According to the above configuration, the imaging direction of the camera 6 of the own robot is synchronized with the imaging direction of the camera 6 of the other robot, whereby the plurality of users are able to smoothly communicate with each other.

Second Embodiment

Hereinafter, with reference to FIGS. 12 and 13, a second embodiment will be described. In the following, the difference between the first embodiment and this embodiment will be mainly described, and overlapping descriptions will be omitted.

Figure 12:
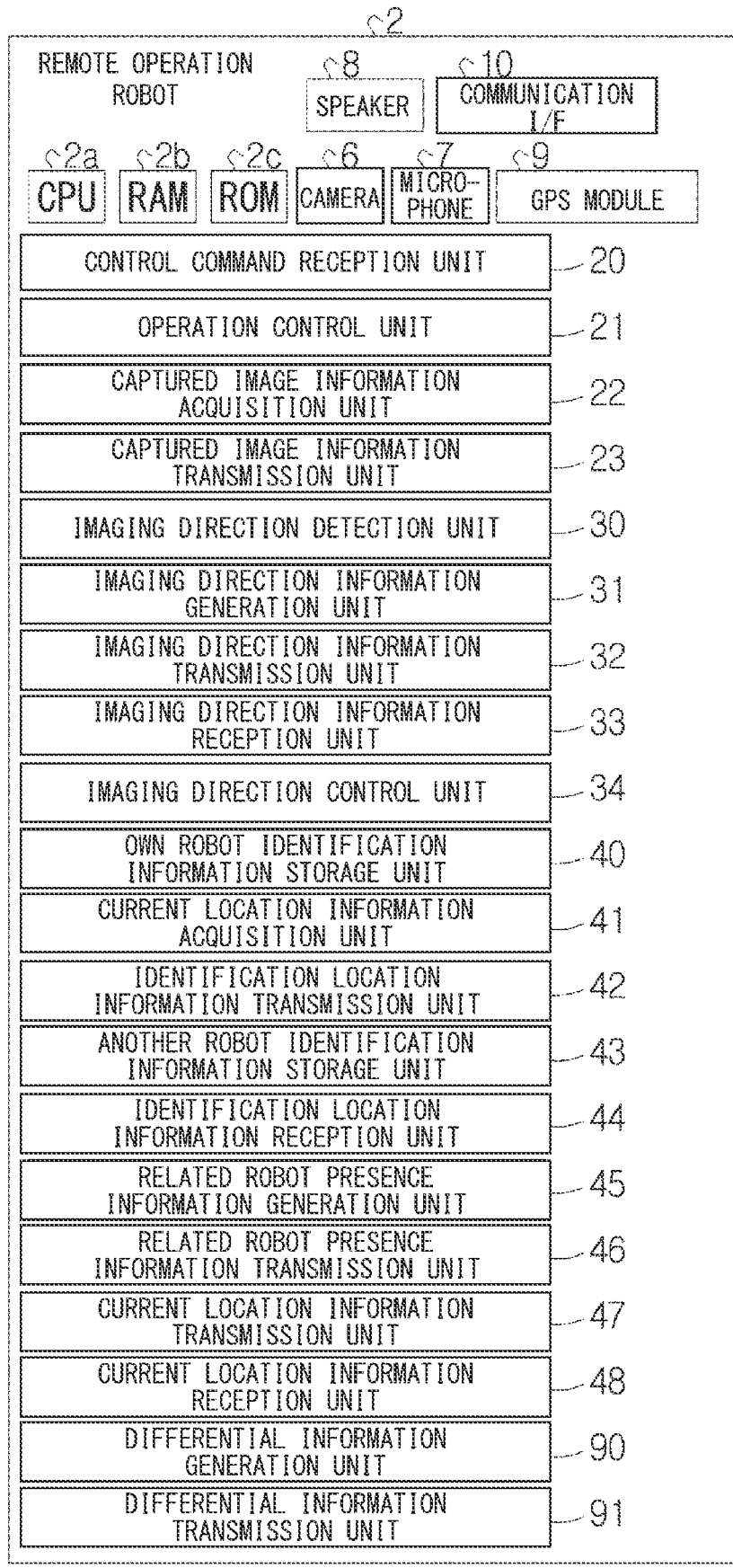
FIG. 12 is a functional block diagram of a remote operation robot (second embodiment)

As shown in FIG. 12, the remote operation robot 2 further includes a differential information generation unit 90 and a differential information transmission unit 91.

The differential information generation unit 90 generates differential information, which indicates the difference between the imaging direction information generated by the imaging direction information generation unit 31 and the imaging direction information received by the imaging direction information reception unit 33. The differential information is typically information indicating the difference between the azimuth angles of the imaging directions of the cameras 6 and the difference between the elevation/depression angles thereof.

The differential information transmission unit 91 transmits the differential information generated by the differential information generation unit 90 to the corresponding remote operation terminal 3.

Figure 13:
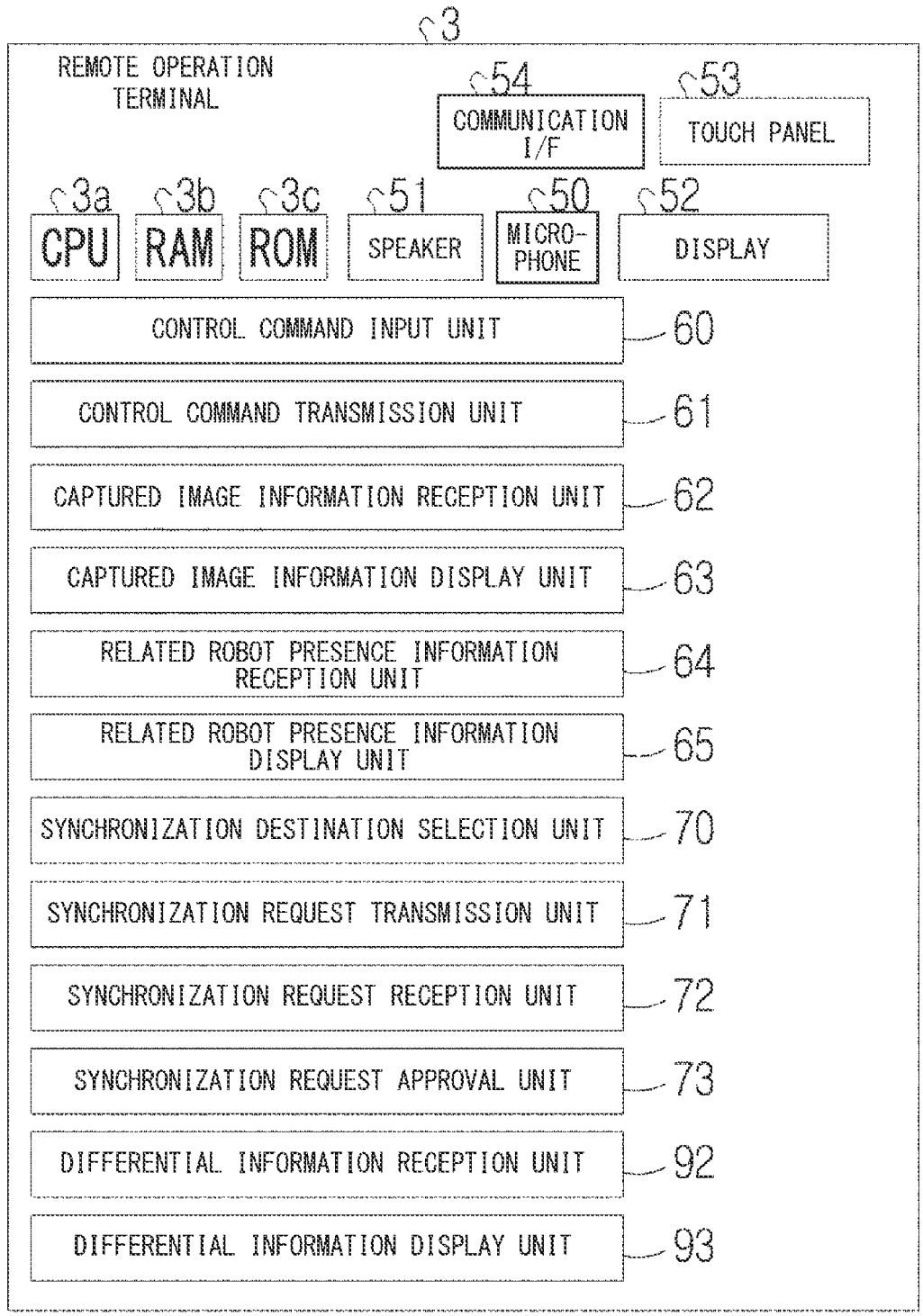
FIG. 13 is a functional block diagram of a remote operation terminal (second embodiment).

As shown in FIG. 13, the remote operation terminal 3 further includes a differential information reception unit 92 and a differential information display unit 93.

The differential information reception unit 92 receives the differential information from the corresponding remote operation robot 2.

The differential information display unit 93 displays the differential information received by the differential information reception unit 92 on the display 52. The differential information display unit 93 may display the differential information on the display 52 in the form of a text message or may display the imaging direction that should be changed on the display 52 in the form of an icon in order to eliminate the difference.

According to the above configuration, the user inputs a control command so as to eliminate the difference indicated by the differential information, which causes the imaging directions of the cameras 6 of the plurality of remote operation robots 2 to approach each other. As a result, the captured image information display units 63 of the plurality of respective remote operation terminals 3 display captured images similar to each other, whereby a plurality of users can smoothly communicate with each other.

Some of the embodiments of the present disclosure have been described above.

The present disclosure can be applied to all the situations where multiple robots that perform tasks under remote control are present in the same environment and have a conversation with each other. Therefore, the present disclosure can be applied to a home robot, a medical care robot, and a logistics robot.

The home robot is, for example, a telepresence robot that is used when paternal and maternal grandparents celebrate the birthday of their mutual grandchild.

The medical care robot is a remote control robot used by a medical staff who visits the homes of elderly people who live alone but have family members taking care of them using remote control robots.

The logistics robot, which is a robot remotely controlled, hands out and receives commodities.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), and optical magnetic storage media (e.g., magneto-optical disks). Examples of non-transitory computer readable media further include CD-Read Only Memory (CD-ROM), CD-R, CD-R/W, and semiconductor memories (such as mask ROM). Examples of non-transitory computer readable media further include Programmable ROM (PROM), Erasable PROM (EPROM), flash ROM, Random Access Memory (RAM), etc. The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

(Supplementary Note 1)

A remote operation system in which a plurality of users who are present in locations away from each other remotely operate a plurality of respective remote operation mobile bodies that are located in one place by operating respective remote operation terminals that the plurality of users have, the remote operation system comprising:

the plurality of remote operation mobile bodies; and the plurality of remote operation terminals, wherein each of the remote operation mobile bodies comprises:

a control command reception unit configured to receive a control command from the corresponding remote operation terminal;

an operation control unit configured to control the operation of the own remote operation mobile body based on the control command;

an imaging unit;

a captured image information acquisition unit configured to acquire captured image information from the imaging unit;

a captured image information transmission unit configured to transmit the captured image information to the corresponding remote operation terminal;

an imaging direction detection unit configured to detect an imaging direction of the imaging unit;

an imaging direction information generation unit configured to generate imaging direction information indicating the imaging direction detected by the imaging direction detection unit;

an imaging direction information transmission unit configured to transmit the imaging direction information to another remote operation mobile body;

an imaging direction information reception unit configured to receive the imaging direction information from another remote operation mobile body; and an imaging direction control unit configured to control the imaging direction of the imaging unit based on the imaging direction information received by the imaging direction information reception unit in such a way that the imaging direction of the imaging unit is synchronized with the imaging direction of the imaging unit of the remote operation mobile body that has transmitted the imaging direction information received by the imaging direction information reception unit, and each of the remote operation terminals comprises:

a control command input unit configured to accept an operation of inputting the control command;

a control command transmission unit configured to transmit the control command to the corresponding remote operation mobile body;

a captured image information reception unit configured to receive the captured image information from the corresponding remote operation mobile body; and a captured image information display unit configured to display the captured image information.

(Supplementary Note 2)

The remote operation system according to Supplementary Note 1, wherein the imaging direction information includes information indicating the azimuth angle and the elevation/depression angle of the imaging direction of the imaging unit.

(Supplementary Note 3)

The remote operation system according to Supplementary Note 1 or 2, wherein each of the remote operation mobile bodies further comprises:

an own body identification information storage unit configured to store body identification information of the own remote operation mobile body;

a current location information acquisition unit configured to acquire current location information;

an identification location information transmission unit configured to transmit identification location information including the body identification information and the current location information to another remote operation mobile body;

an another body identification information storage unit configured to store body identification information of the remote operation mobile body of a user who has a relation with the user who corresponds to the own remote operation mobile body;

an identification location information reception unit configured to receive the identification location information from another remote operation mobile body;

a related mobile body presence information generation unit configured to generate related mobile body presence information indicating that the remote operation mobile body of a user who has a relation with the user who corresponds to the own remote operation mobile body is close to the own remote operation mobile body based on the body identification information stored in the other body identification information storage unit and the identification location information received by the identification location information reception unit; and a related mobile body presence information transmission unit configured to transmit the related mobile body presence information to the corresponding remote operation terminal, and each of the remote operation terminals comprises:

a related mobile body presence information reception unit configured to receive the related mobile body presence information from the corresponding remote operation mobile body; and a related mobile body presence information display unit configured to display the related mobile body presence information.

(Supplementary Note 4)

The remote operation system according to any one of Supplementary Notes 1 to 3, wherein each of the remote operation terminals further comprises:

a synchronization request transmission unit configured to transmit a synchronization request to another remote operation terminal;

a synchronization request reception unit configured to receive the synchronization request from another remote operation terminal; and a synchronization request approval unit configured to accept an operation of approving the synchronization request received from the other remote operation terminal, and the imaging direction control unit of each of the remote operation mobile bodies starts synchronization processing after the synchronization request is approved.

(Supplementary Note 5)

The remote operation system according to Supplementary Note 4, wherein the imaging direction control unit of each of the remote operation mobile bodies starts synchronization processing after the synchronization request approval unit of the remote operation terminal that corresponds to the own remote operation mobile body has accepted the operation of approving the synchronization request.

(Supplementary Note 6)

The remote operation system according to Supplementary Note 4 or 5, wherein each of the remote operation terminals further comprises:
a synchronization destination selection unit configured to accept an operation of selecting at least one remote operation mobile body from at least one remote operation mobile body shown in the captured image information displayed on the captured image information display unit; and
the synchronization request transmission unit transmits the synchronization request to a remote operation terminal that corresponds to the at least one remote operation mobile body that has been selected.

(Supplementary Note 7)

The remote operation system according to any one of Supplementary Notes 4 to 6, wherein the operation control unit controls the operation of the own remote operation mobile body in such a way that the own remote operation mobile body moves following the remote operation mobile body that has transmitted the synchronization request while the imaging direction control unit is executing the synchronization processing.

(Supplementary Note 8)

The remote operation system according to any one of Supplementary Notes 1 to 7, wherein the imaging direction control unit ends the synchronization processing after the control command reception unit receives a control command for changing the imaging direction of the imaging unit.

(Supplementary Note 9)

The remote operation system according to any one of Supplementary Notes 1 to 8, wherein the imaging direction control unit returns the imaging direction of the imaging unit back to a reference imaging direction after the synchronization processing is ended.

(Supplementary Note 10)

A remote operation mobile body comprising:

an imaging unit;

an imaging direction information reception unit configured to receive, from another remote operation mobile body, imaging direction information indicating an imaging direction of the imaging unit of the other remote operation mobile body; and an imaging direction control unit configured to control the imaging direction of the imaging unit based on the imaging direction information in such a way that the imaging direction of the imaging unit is synchronized with the imaging direction of the imaging unit of the remote operation mobile body that has transmitted the imaging direction information.

(Supplementary Note 11)

A remote operation method in which a plurality of users who are present in locations away from each other remotely operate a plurality of respective remote operation mobile bodies that are located in one place by operating respective remote operation terminals that the plurality of users have, wherein each of the remote operation mobile bodies receives a control command from the corresponding remote operation terminal, each of the remote operation mobile bodies controls the operation of the own remote operation mobile body based on the control command, each of the remote operation mobile bodies acquires captured image information from the imaging unit of the own remote operation mobile body, each of the remote operation mobile bodies transmits the captured image information to the corresponding remote operation terminal, each of the remote operation mobile bodies detects an imaging direction of the imaging unit, each of the remote operation mobile bodies generates imaging direction information indicating the detected imaging direction, each of the remote operation mobile bodies transmits the imaging direction information to another remote operation mobile body, each of the remote operation mobile bodies receives the imaging direction information from another remote operation mobile body, each of the remote operation mobile bodies controls the imaging direction of the imaging unit based on the received imaging direction information in such a way that the imaging direction of the imaging unit is synchronized with the imaging direction of the imaging unit of the remote operation mobile body that has transmitted the received imaging direction information, each of the remote operation terminals accepts an operation of inputting the control command, each of the remote operation terminals transmits the control command to the corresponding remote operation mobile body, each of the remote operation terminals receives the captured image information from the corresponding remote operation mobile body, and each of the remote operation terminals displays the captured image information.

(Supplementary Note 12)

A program for causing a computer to execute the remote operation method according to Supplementary Note 11.

(Supplementary Note 13)

A remote operation system in which a plurality of users who are present in locations away from each other remotely operate a plurality of respective remote operation mobile bodies that are located in one place by operating respective remote operation terminals that the plurality of users have, the remote operation system comprising:

the plurality of remote operation mobile bodies; and
the plurality of remote operation terminals, wherein
each of the remote operation mobile bodies comprises:
a control command reception unit configured to receive a control command from the corresponding remote operation terminal;
an operation control unit configured to control the operation of the own remote operation mobile body based on the control command;
an imaging unit;
a captured image information acquisition unit configured to acquire captured image information from the imaging unit;
a captured image information transmission unit configured to transmit the captured image information to the corresponding remote operation terminal;
an imaging direction detection unit configured to detect an imaging direction of the imaging unit;
an imaging direction information generation unit configured to generate imaging direction information indicating the imaging direction detected by the imaging direction detection unit;

an imaging direction information transmission unit configured to transmit the imaging direction information to another remote operation mobile body;

an imaging direction information reception unit configured to receive the imaging direction information from another remote operation mobile body;

a differential information generation unit configured to generate differential information, which indicates the difference between the imaging direction information generated by the imaging direction information generation unit and the imaging direction information received by the imaging direction information reception unit; and a differential information transmission unit configured to transmit the differential information to the corresponding remote operation terminal, and each of the remote operation terminals comprises:

a control command input unit configured to accept an operation of inputting the control command;

a control command transmission unit configured to transmit the control command to the corresponding remote operation mobile body;

a captured image information reception unit configured to receive the captured image information from the corresponding remote operation mobile body;

a captured image information display unit configured to display the captured image information;

a differential information reception unit configured to receive the differential information from the corresponding remote operation mobile body; and a differential information display unit configured to display the differential information.

(Supplementary Note 14)

The remote operation method according to Supplementary Note 11, wherein the imaging direction information includes information indicating the azimuth angle and the elevation/depression angle of the imaging direction of the imaging unit.

(Supplementary Note 15)

The remote operation method according to Supplementary Note 11 or 14, wherein each of the remote operation mobile bodies stores body identification information of the own remote operation mobile body, each of the remote operation mobile bodies acquires current location information, each of the remote operation mobile bodies transmits identification location information including the body identification information and the current location information to another remote operation mobile body, each of the remote operation mobile bodies stores body identification information of the remote operation mobile body of a user who has a relation with the user who corresponds to the own remote operation mobile body, each of the remote operation mobile bodies receives the identification location information from another remote operation mobile body, each of the remote operation mobile bodies generates related mobile body presence information indicating that the remote operation mobile body of the user who has a relation with the user who corresponds to the own remote operation mobile body is close to the own remote operation mobile body based on the body identification information that has been stored and the identification location information that has been received, each of the remote operation mobile bodies transmits the related mobile body presence information to the corresponding remote operation terminal, each of the remote operation terminals receives the related mobile body presence information from the corresponding remote operation mobile body, and each of the remote operation terminals displays the related mobile body presence information.

(Supplementary Note 16)

The remote operation method according to any one of Supplementary Notes 11, 14, and 15, wherein each of the remote operation terminals transmits a synchronization request to another remote operation terminal, each of the remote operation terminals receives the synchronization request from another remote operation terminal, each of the remote operation terminals accepts an operation of approving the synchronization request received from the other remote operation terminal, and each of the remote operation mobile bodies starts synchronization processing after the synchronization request is approved.

(Supplementary Note 17)

The remote operation method according to Supplementary Note 16, wherein each of the remote operation mobile bodies starts synchronization processing after the remote operation terminal that corresponds to the own remote operation mobile body accepts the operation of approving the synchronization request.

(Supplementary Note 18)

The remote operation method according to Supplementary Note 16 or 17, wherein each of the remote operation terminals accepts an operation of selecting at least one remote operation mobile body from at least one remote operation mobile body shown in the captured image information that is displayed, and each of the remote operation terminals transmits the synchronization request to the remote operation terminal that corresponds to the at least one remote operation mobile body that has been selected.

(Supplementary Note 19)

The remote operation method according to any one of Supplementary Notes 11 and 14 to 18, wherein each of the remote operation mobile bodies ends the synchronization processing after a control command for changing the imaging direction of the imaging unit is received.

(Supplementary Note 20)

The remote operation method according to any one of Supplementary Notes 11 and 14 to 19, wherein each of the remote operation mobile bodies controls the operation of the own remote operation mobile body in such a way that the own remote operation mobile body moves following the remote operation mobile body that has transmitted the synchronization request while the synchronization processing is being executed.

(Supplementary Note 21)

The remote operation method according to any one of Supplementary Notes 11 and 14 to 20, wherein each of the remote operation mobile bodies returns the imaging direction of the imaging unit back to a reference imaging direction when the synchronization processing is ended.

(Supplementary Note 22)

A remote operation method in which a plurality of users who are present in locations away from each other remotely operate a plurality of respective remote operation mobile bodies that are located in one place by operating respective remote operation terminals that the plurality of users have, wherein each of the remote operation mobile bodies receives a control command from the corresponding remote operation terminal, each of the remote operation mobile bodies controls the operation of the own remote operation mobile body based on the control command, each of the remote operation mobile bodies acquires captured image information from an imaging unit of the own remote operation mobile body, each of the remote operation mobile bodies transmits the captured image information to the corresponding remote operation terminal, each of the remote operation mobile bodies detects an imaging direction of the imaging unit, each of the remote operation mobile bodies generates imaging direction information indicating the detected imaging direction, each of the remote operation mobile bodies transmits the imaging direction information to another remote operation mobile body, each of the remote operation mobile bodies receives the imaging direction information from another remote operation mobile body, each of the remote operation mobile bodies generates differential information indicating the difference between the imaging direction information that has been generated and the imaging direction information that has been received, each of the remote operation mobile bodies transmits the differential information to the corresponding remote operation terminal, each of the remote operation terminals accepts an operation of inputting the control command, each of the remote operation terminals transmits the control command to the corresponding remote operation mobile body, each of the remote operation terminals receives the captured image information from the corresponding remote operation mobile body, each of the remote operation terminals displays the captured image information, each of the remote operation terminals receives the differential information from the corresponding remote operation mobile body, and each of the remote operation terminals displays the differential information.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A remote operation system in which a plurality of users who are present in locations away from each other remotely operate a plurality of respective remote operation mobile bodies that are located in one place by operating respective remote operation terminals that the plurality of users have, the remote operation system comprising:

the plurality of remote operation mobile bodies; and the plurality of remote operation terminals, wherein each of the remote operation mobile bodies comprises:

a control command reception unit configured to receive a control command from the corresponding remote operation terminal;

an operation control unit configured to control the operation of the own remote operation mobile body based on the control command;

an imaging unit;

a captured image information acquisition unit configured to acquire captured image information from the imaging unit;

a captured image information transmission unit configured to transmit the captured image information to the corresponding remote operation terminal;

an imaging direction detection unit configured to detect an imaging direction of the imaging unit;

an imaging direction information generation unit configured to generate imaging direction information indicating the imaging direction detected by the imaging direction detection unit;

an imaging direction information transmission unit configured to transmit the imaging direction information to another remote operation mobile body;

an imaging direction information reception unit configured to receive the imaging direction information from another remote operation mobile body; and an imaging direction control unit configured to control the imaging direction of the imaging unit based on the imaging direction information received by the imaging direction information reception unit in such a way that the imaging direction of the imaging unit is synchronized with the imaging direction of the imaging unit of the remote operation mobile body that has transmitted the imaging direction information received by the imaging direction information reception unit, and each of the remote operation terminals comprises:

a control command input unit configured to accept an operation of inputting the control command;

a control command transmission unit configured to transmit the control command to the corresponding remote operation mobile body;

a captured image information reception unit configured to receive the captured image information from the corresponding remote operation mobile body; and a captured image information display unit configured to display the captured image information, each of the remote operation mobile bodies further comprises:

an own body identification information storage unit configured to store body identification information of the own remote operation mobile body;

a current location information acquisition unit configured to acquire current location information;

an identification location information transmission unit configured to transmit identification location information including the body identification information and the current location information to another remote operation mobile body;

an another body identification information storage unit configured to store body identification information of the remote operation mobile body of a user who has a relation with the user who corresponds to the own remote operation mobile body;

an identification location information reception unit configured to receive the identification location information from another remote operation mobile body;

a related mobile body presence information generation unit configured to generate related mobile body presence information indicating that the remote operation mobile body of a user who has a relation with the user who corresponds to the own remote operation mobile body is close to the own remote operation mobile body based on the body identification information stored in the other body identification information storage unit and the identification location information received by the identification location information reception unit; and a related mobile body presence information transmission unit configured to transmit the related mobile body presence information to the corresponding remote operation terminal, and each of the remote operation terminals comprises:

a related mobile body presence information reception unit configured to receive the related mobile body presence information from the corresponding remote operation mobile body; and a related mobile body presence information display unit configured to display the related mobile body presence information.

2. The remote operation system according to claim 1, wherein the imaging direction information includes information indicating an azimuth angle and an elevation/depression angle of the imaging direction of the imaging unit.

3. The remote operation system according to claim 1, wherein each of the remote operation terminals further comprises:

a synchronization request transmission unit configured to transmit a synchronization request to another remote operation terminal;

a synchronization request reception unit configured to receive the synchronization request from another remote operation terminal; and a synchronization request approval unit configured to accept an operation of approving the synchronization request received from the other remote operation terminal, and the imaging direction control unit of each of the remote operation mobile bodies starts synchronization processing after the synchronization request is approved.

4. The remote operation system according to claim 3, wherein the imaging direction control unit of each of the remote operation mobile bodies starts synchronization processing after the synchronization request approval unit of the remote operation terminal that corresponds to the own remote operation mobile body has accepted the operation of approving the synchronization request.

5. The remote operation system according to claim 3, wherein each of the remote operation terminals further comprises:

a synchronization destination selection unit configured to accept an operation of selecting at least one remote operation mobile body from at least one remote operation mobile body shown in the captured image information displayed on the captured image information display unit; and the synchronization request transmission unit transmits the synchronization request to a remote operation terminal that corresponds to the at least one remote operation mobile body that has been selected.

6. The remote operation system according to claim 3, wherein the operation control unit controls the operation of the own remote operation mobile body in such a way that the own remote operation mobile body moves following the remote operation mobile body that has transmitted the synchronization request while the imaging direction control unit is executing the synchronization processing.

7. The remote operation system according to claim 1, wherein the imaging direction control unit ends the synchronization processing after the control command reception unit receives a control command for changing the imaging direction of the imaging unit.

8. The remote operation system according to claim 1, wherein the imaging direction control unit returns the imaging direction of the imaging unit back to a reference imaging direction after the synchronization processing is ended.

9. A remote operation method in which a plurality of users who are present in locations away from each other remotely operate a plurality of respective remote operation mobile bodies that are located in one place by operating respective remote operation terminals that the plurality of users have, wherein each of the remote operation mobile bodies receives a control command from the corresponding remote operation terminal, each of the remote operation mobile bodies controls the operation of the own remote operation mobile body based on the control command, each of the remote operation mobile bodies acquires captured image information from the imaging unit of the own remote operation mobile body, each of the remote operation mobile bodies transmits the captured image information to the corresponding remote operation terminal, each of the remote operation mobile bodies detects an imaging direction of the imaging unit, each of the remote operation mobile bodies generates imaging direction information indicating the detected imaging direction, each of the remote operation mobile bodies transmits the imaging direction information to another remote operation mobile body, each of the remote operation mobile bodies receives the imaging direction information from another remote operation mobile body, each of the remote operation mobile bodies controls the imaging direction of the imaging unit based on the received imaging direction information in such a way that the imaging direction of the imaging unit is synchronized with the imaging direction of the imaging unit of the remote operation mobile body that has transmitted the received imaging direction information, each of the remote operation terminals accepts an operation of inputting the control command, each of the remote operation terminals transmits the control command to the corresponding remote operation mobile body, each of the remote operation terminals receives the captured image information from the corresponding remote operation mobile body, each of the remote operation terminals displays the captured image information, each of the remote operation mobile bodies stores body identification information of the own remote operation mobile body, each of the remote operation mobile bodies acquires current location information, each of the remote operation mobile bodies transmits identification location information including the body identification information and the current location information to another remote operation mobile body, each of the remote operation mobile bodies stores body identification information of the remote operation mobile body of a user who has a relation with the user who corresponds to the own remote operation mobile body, each of the remote operation mobile bodies receives the identification location information from another remote operation mobile body, each of the remote operation mobile bodies generates related mobile body presence information indicating that the remote operation mobile body of the user who has a relation with the user who corresponds to the own remote operation mobile body is close to the own remote operation mobile body based on the body identification information that has been stored and the identification location information that has been received, each of the remote operation mobile bodies transmits the related mobile body presence information to the corresponding remote operation terminal, each of the remote operation terminals receives the related mobile body presence information from the corresponding remote operation mobile body, and each of the remote operation terminals displays the related mobile body presence information.

10. The remote operation method according to claim 9, wherein the imaging direction information includes information indicating an azimuth angle and an elevation/depression angle of the imaging direction of the imaging unit.

11. The remote operation method according to claim 9, wherein
each of the remote operation terminals transmits a synchronization request to another remote operation terminal,
each of the remote operation terminals receives the synchronization request from another remote operation terminal,
each of the remote operation terminals accepts an operation of approving the synchronization request received from the other remote operation terminal, and
each of the remote operation mobile bodies starts synchronization processing after the synchronization request is approved.

12. The remote operation method according to claim 11, wherein each of the remote operation mobile bodies starts synchronization processing after the remote operation terminal that corresponds to the own remote operation mobile body accepts the operation of approving the synchronization request.

13. The remote operation method according to claim 11, wherein
each of the remote operation terminals accepts an operation of selecting at least one remote operation mobile body from at least one remote operation mobile body shown in the captured image information that is displayed, and
each of the remote operation terminals transmits the synchronization request to the remote operation terminal that corresponds to the at least one remote operation mobile body that has been selected.

14. The remote operation method according to claim 11, wherein each of the remote operation mobile bodies controls the operation of the own remote operation mobile body in such a way that the own remote operation mobile body moves following the remote operation mobile body that has transmitted the synchronization request while the synchronization processing is being executed.

15. The remote operation method according to claim 9, wherein each of the remote operation mobile bodies ends the synchronization processing after a control command for changing the imaging direction of the imaging unit is received.

16. The remote operation method according to claim 9, wherein each of the remote operation mobile bodies returns the imaging direction of the imaging unit back to a reference imaging direction when the synchronization processing is ended.

17. A non-transitory computer readable medium that stores a program for causing a computer to execute a remote operation method in which a plurality of users who are present in locations away from each other remotely operate a plurality of respective remote operation mobile bodies that are located in one place by operating respective remote operation terminals that the plurality of users have, wherein
each of the remote operation mobile bodies receives a control command from the corresponding remote operation terminal,
each of the remote operation mobile bodies controls the operation of the own remote operation mobile body based on the control command,
each of the remote operation mobile bodies acquires captured image information from the imaging unit of the own remote operation mobile body,
each of the remote operation mobile bodies transmits the captured image information to the corresponding remote operation terminal,
each of the remote operation mobile bodies detects an imaging direction of the imaging unit,
each of the remote operation mobile bodies generates imaging direction information indicating the detected imaging direction,
each of the remote operation mobile bodies transmits the imaging direction information to another remote operation mobile body,
each of the remote operation mobile bodies receives the imaging direction information from another remote operation mobile body,
each of the remote operation mobile bodies controls the imaging direction of the imaging unit based on the received imaging direction information in such a way that the imaging direction of the imaging unit is synchronized with the imaging direction of the imaging unit of the remote operation mobile body that has transmitted the received imaging direction information,
each of the remote operation terminals accepts an operation of inputting the control command,
each of the remote operation terminals transmits the control command to the corresponding remote operation mobile body,
each of the remote operation terminals receives the captured image information from the corresponding remote operation mobile body,
each of the remote operation terminals displays the captured image information,
each of the remote operation mobile bodies stores body identification information of the own remote operation mobile body,
each of the remote operation mobile bodies acquires current location information,
each of the remote operation mobile bodies transmits identification location information including the body identification information and the current location information to another remote operation mobile body, each of the remote operation mobile bodies stores body identification information of the remote operation mobile body of a user who has a relation with the user who corresponds to the own remote operation mobile body, each of the remote operation mobile bodies receives the identification location information from another remote operation mobile body, each of the remote operation mobile bodies generates related mobile body presence information indicating that the remote operation mobile body of the user who has a relation with the user who corresponds to the own remote operation mobile body is close to the own remote operation mobile body based on the body identification information that has been stored and the identification location information that has been received, each of the remote operation mobile bodies transmits the related mobile body presence information to the corresponding remote operation terminal, each of the remote operation terminals receives the related mobile body presence information from the corresponding remote operation mobile body, and each of the remote operation terminals displays the related mobile body presence information.

* * * * *